United States Patent
Duvuru et al.

(10) Patent No.: US 9,830,200 B2
(45) Date of Patent: Nov. 28, 2017

(54) BUSY LOCK AND A PASSIVE LOCK FOR EMBEDDED LOAD MANAGEMENT

(71) Applicant: International Business Machines Corporation, Armonk, NY (US)

(72) Inventors: Srinath Duvuru, Portland, OR (US); Marco Greco, Staines (GB); Jeffrey A. McMahon, Kansas City, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 14/668,137

(22) Filed: Mar. 25, 2015

(65) Prior Publication Data

US 2015/0301871 A1    Oct. 22, 2015

(30) Foreign Application Priority Data

Apr. 16, 2014 (GB) .................................. 1406833.2

(51) Int. Cl.
*G06F 9/46* (2006.01)
*G06F 9/52* (2006.01)

(52) U.S. Cl.
CPC ............... *G06F 9/526* (2013.01); *G06F 9/52* (2013.01); *G06F 9/524* (2013.01)

(58) Field of Classification Search
CPC . G06F 9/505; G06F 9/52; G06F 9/524; G06F 9/526
USPC ................................................ 718/100, 104
See application file for complete search history.

(56) References Cited

U.S. PATENT DOCUMENTS

| | | | |
|---|---|---|---|
| 6,374,285 B1 * | 4/2002 | Scales ..................... | G06F 9/526 710/200 |
| 7,383,368 B2 | 6/2008 | Schopp | |
| 7,904,612 B2 * | 3/2011 | Lenk ........................ | G06F 9/52 710/15 |

(Continued)

OTHER PUBLICATIONS

Anderson, Thomas E. "The performance of spin lock alternatives for shared-money multiprocessors." IEEE Transactions on Parallel and Distributed Systems 1.1 (1990): 6-16.*

(Continued)

*Primary Examiner* — Benjamin Wu
*Assistant Examiner* — Willy W Huaracha
(74) *Attorney, Agent, or Firm* — Cantor Colburn LLP; Robert Bunker

(57) ABSTRACT

Embodiments relate to managing exclusive control of a shareable resource between a plurality of concurrently executing threads. An aspect includes determining the number of concurrently executing threads waiting for exclusive control of the shareable resource. Another aspect includes, responsive to a determination that the number of concurrently executing threads waiting for exclusive control of the shareable resource exceeds a pre-determined value, one or more of said concurrently executing threads terminating its wait for exclusive control of the shareable resource. Another aspect includes, responsive to a determination that the number of concurrently executing threads waiting for exclusive control of the shareable resource is less than a pre-determined value, one or more of said one or more concurrently executing threads which terminated its wait for exclusive control of the shareable resource, restarting a wait for exclusive control of the shareable resource.

11 Claims, 23 Drawing Sheets

(56) References Cited

U.S. PATENT DOCUMENTS

| | | | |
|---|---|---|---|
| 8,434,082 B2* | 4/2013 | Bliss | G06F 9/526 |
| | | | 718/1 |
| 2002/0107854 A1* | 8/2002 | Hua | G06F 9/526 |
| 2005/0081204 A1 | 4/2005 | Schopp | |
| 2007/0006232 A1* | 1/2007 | Bliss | G06F 9/526 |
| | | | 718/100 |
| 2010/0138836 A1 | 6/2010 | Dice et al. | |
| 2010/0186013 A1 | 7/2010 | Harrop | |
| 2011/0126204 A1* | 5/2011 | Omara | G06F 9/526 |
| | | | 718/103 |
| 2011/0167428 A1 | 7/2011 | Nair et al. | |
| 2011/0209130 A1 | 8/2011 | Burka | |
| 2012/0304185 A1 | 11/2012 | Horikawa | |
| 2013/0205057 A1 | 8/2013 | Sasaoka | |
| 2013/0318537 A1 | 11/2013 | Rogers et al. | |

OTHER PUBLICATIONS

International Search Report dated Oct. 21, 2014 for Application No. GB1406833.2; pp. 1-3.

Meneghin, M., et al., "IBM Research Report: Performance Evaluation of Inter-Thread Communication Mechanisms on Multicore/Multithreaded Architectures," RC25283 (IRE1205-008) May 1, 2012, Computer Science; pp. 1-12.

* cited by examiner

BUSY LOCK AND A PASSIVE LOCK FOR EMBEDDED LOAD MANAGEMENT

PRIORITY

This application claims priority to United Kingdom Patent Application No. GB 1406833.2, filed Apr. 16, 2014, and all the benefits accruing therefrom under 35 U.S.C. §119, the contents of which in its entirety are herein incorporated by reference.

BACKGROUND

The present disclosure relates generally to lock management, and more specifically to load management for locks on shared resources by embedding load management capabilities within the lock.

Concurrent algorithms (except those in the lock free class) utilize some sort of access control mechanism to ensure synchronization, that is, individual access to shared resources. Using mutual exclusion locks, for instance, each thread, before accessing an individual shared resource must acquire a lock, in order to continue, or, if the lock is not available, the thread waits until it has been released by the current owner.

In this context, thread waiting can be achieved in two possible ways. A busy lock may be used, that is, the thread enters a tight loop inspecting the lock, until it is found to be free. A passive lock may be used, in which the thread enqueues itself in a linked list of waiting threads and suspends execution, waiting to be woken up by the lock owner once the lock is available.

When more threads try to access the same lock than there are CPUs available, all the CPUs will end up being busy running tight loops trying to acquire the same lock. This causes a problem called "Starvation". This will prevent other threads, whether they are trying to access the lock, or even worse, doing unrelated work, from acquiring CPU resources. Since all CPUs (bar the one associated with the lock owner) will be looping on the lock but not doing any useful work, the whole system will effectively be starved to a grinding halt. Some designs of busy locks become a bottleneck when a certain threshold load is applied to them. When this happens, the CPU spends more time getting past the locks than doing actual work, at the same time preventing threads that don't need the locks from doing any work.

SUMMARY

Embodiments relate to managing exclusive control of a shareable resource between a plurality of concurrently executing threads. An aspect includes determining the number of concurrently executing threads waiting for exclusive control of the shareable resource. Another aspect includes, responsive to a determination that the number of concurrently executing threads waiting for exclusive control of the shareable resource exceeds a pre-determined value, one or more of said concurrently executing threads terminating its wait for exclusive control of the shareable resource. Another aspect includes, responsive to a determination that the number of concurrently executing threads waiting for exclusive control of the shareable resource is less than a pre-determined value, one or more of said one or more concurrently executing threads which terminated its wait for exclusive control of the shareable resource, restarting a wait for exclusive control of the shareable resource.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

Various embodiments will now be described, by way of example only, with reference to the following drawings in which.

DETAILED DESCRIPTION

Figure 1:
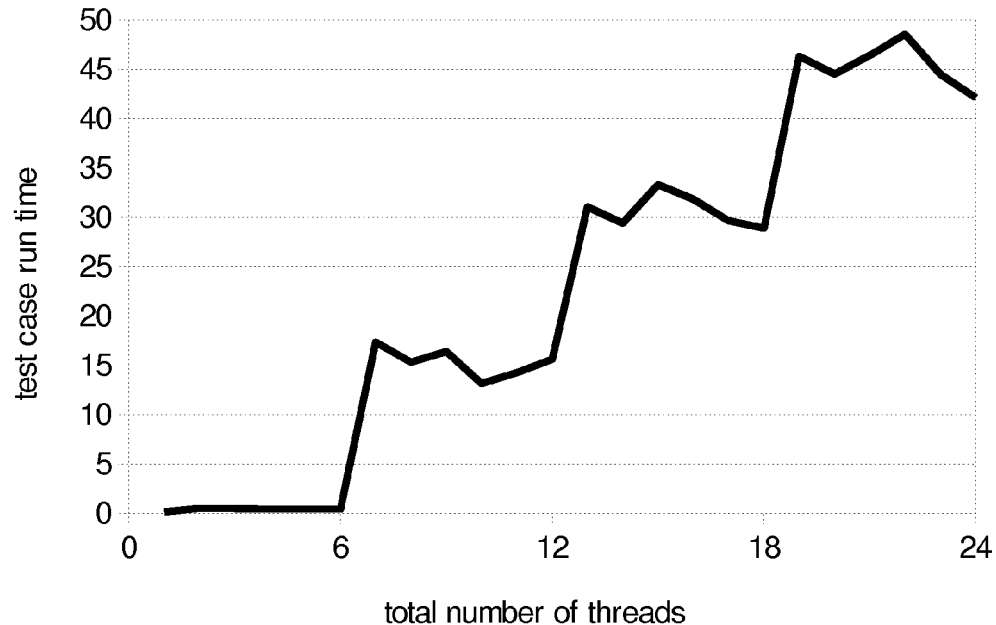
FIG. 1 shows a graph of test case run time versus total number of threads in a first test case scenario in which a prior art single work thread and multiple load threads are trying to access a lock.

Embodiments of a busy lock and a passive lock for embedded load management provide a method for managing exclusive control of a shareable resource between a plurality of concurrently executing threads, the method comprising: determining the number of concurrently executing threads waiting for exclusive control of the shareable resource; responsive to a determination that the number of concurrently executing threads waiting for exclusive control of the shareable resource exceeds a pre-determined value, one or more of said concurrently executing threads terminating its wait for exclusive control of the shareable resource; and responsive to a determination that the number of concurrently executing threads waiting for exclusive control of the shareable resource is less than a pre-determined value, one or more of said one or more concurrently executing threads which terminated its wait for exclusive control of the shareable resource, restarting a wait for exclusive control of the shareable resource. In some embodiments, wherein upon said one or more of said concurrently executing threads terminating its wait for exclusive control of the shareable resource, another of the concurrently executing threads from a system ready queue begins execution.

In some embodiments, the method further comprising, before terminating its wait for exclusive control of the shareable resource, said one or more concurrently executing threads checking for the presence of others of said one or more concurrently executing threads in a system ready queue and not terminating its wait for exclusive control of the shareable resource if there are no other concurrently executing threads in a system ready queue. In some embodiments, if a concurrently executing thread has previously terminated and restarted a wait for exclusive control of the shareable resource, it does not terminate its wait for exclusive control of the shareable resource. In some embodiments, if exclusive control of the shareable resource is granted in an ordered manner, concurrently executing threads do not terminate their wait for exclusive control of the shareable resource if the preceding thread has terminated its wait for exclusive control of the shareable resource. In some embodiments, the method further comprising a concurrently executing thread which terminates its wait for exclusive control of the shareable resource, returning resource associated with the shareable resource for use by others of the concurrently executing threads.

In some embodiments, access to the shareable resource is controlled by a passive lock comprising a sequence of an outer busy lock and an inner busy lock, a first one of said concurrently executing threads wanting exclusive control of the shareable resource acquiring the outer busy lock, followed by the inner busy lock, the method further comprising: on releasing control of the passive lock, said first one of said concurrently executing threads acquiring the inner busy lock and determining the number of concurrently executing threads waiting for exclusive control of the shareable resource; and responsive to a determination that the number of concurrently threads waiting for exclusive control of the shareable resource exceeds a pre-determined value, said one of said first concurrently executing threads passing ownership of the passive lock and the inner busy lock to the concurrently executing thread located at the front of a system ready queue.

Embodiments also provide a system for managing exclusive control of a shareable resource between a plurality of concurrently executing threads, the system comprising: means for determining the number of concurrently executing threads waiting for exclusive control of the shareable resource; means, responsive to a determination that the number of concurrently executing threads waiting for exclusive control of the shareable resource exceeds a pre-determined value, one or more of said concurrently executing threads terminating its wait for exclusive control of the shareable resource; and means, responsive to a determination that the number of concurrently executing threads waiting for exclusive control of the shareable resource is less than a pre-determined value, one or more of said one or more concurrently executing threads which terminated its wait for exclusive control of the shareable resource, restarting a wait for exclusive control of the shareable resource.

Embodiments also provide a system as described above, wherein access to the shareable resource is controlled by a passive lock comprising a sequence of an outer busy lock and an inner busy lock, a first one of said concurrently executing thread wanting exclusive control of the shareable resource acquiring the outer busy lock, followed by the inner busy lock, the system further comprising: on releasing control of the passive lock, means for said first one of said concurrently executing thread to acquire the inner busy lock and determine the number of concurrently executing threads waiting for exclusive control of the shareable resource; and wherein, responsive to a determination that the number of concurrently executing threads waiting for exclusive control of the shareable resource exceeds a pre-determined value, for said first concurrently executing thread passing ownership of the passive lock and the inner busy lock to the concurrently executing thread located at the front of a system ready queue.

Embodiments also provide a computer program product for managing exclusive control of a shareable resource between a plurality of concurrently executing threads, the computer program product comprising: a computer readable storage medium having computer readable program code embodied therewith, the computer readable program code adapted to perform the method described above when said program is run on a computer.

As mentioned above, thread waiting can be achieved in two possible ways. A busy lock may be used, that is, the thread enters a tight loop inspecting the lock, until it is found to be free. A passive lock may be used, in which the thread enqueues itself in a linked list of waiting threads and suspends execution, waiting to be woken up by the lock owner once the lock is available.

There are at least two factors that affect whether a busy lock or a passive lock is employed in specific cases. Firstly, if lock access is fast, the cost of a double context switch (once to have the lock requestor yield, and once to wake it up) might be excessive compared to the time spent waiting for the lock to be available. In this case a busy lock may be used instead of a passive lock. Secondly, if manipulating the shared resource protected by the lock entails thread yields, for instance, waiting for I/O, the lock has to be passive. If busy locks are used, there is the risk that as the lock owner yields and more threads than CPUs are available start looping on the lock, the lock owner never gets a chance to run after the reason for yielding terminates, meaning the lock would never get released, resulting in a stall. Forcing the tentative lockers to add themselves to a queue and yield ensures that CPUs are available for the lock owner to run on once woken up.

Because passive locks require manipulation of the lock structure in a critical section, they are normally implemented as a lock structure protected by an outer busy lock. Lock requests entail acquiring the outer busy lock, and once acquired, either acquiring the inner passive lock, if available, or manipulating the lock queue if not available, and relinquishing the outer busy lock once the inner passive lock is in a consistent state. Releasing the inner passive lock entails acquiring the outer busy lock again, marking the outer busy lock as free, removing the first waiter thread from the waiting queue, releasing the outer busy lock and waking up the waiter thread just removed from the queue. For this reason passive locks suffer from the same problems as busy locks, and, as will be described below, have further side effects of their own.

The side effects both passive locks and busy locks can suffer from include: (i) "Thundering herd", (ii) "CPU cache invalidation", (iii) "In core thread starvation"; (iv) "Starvation"; and (v) "Convoys".

"Thundering herd"—typical test and set locks will try to acquire the lock using a specific assembly language instruction which writes a specific value into the lock structure and reads back, with the bus locked, the value that was previously stored. If the value read back from the lock differs from the value previously stored, then the lock has been acquired, otherwise a new attempt at acquiring the lock is required. This process works when only a couple of threads are trying to acquire the lock. However when many threads, a "thundering herd" of threads, are trying to acquire the lock, the lock turns busy which results in a substantial drain on the CPU and, more importantly bus resources, as well as CPU cache invalidation, described below.

"CPU cache invalidation"—Write heavy algorithms such as test and set, by virtue of rewriting to the same memory location over and over again, will force other CPUs to reload their internal memory cache at every loop. If only one thread is looping on the lock, this is not a problem, but when two or more threads are running on different CPUs looping on the same lock, each will invalidate the other's memory cache entry for the lock, forcing them to access the lock from memory rather than from cache, at a much higher cost, greatly affecting the lock performance.

"In core thread starvation"—The above problems can be made worse when coarse grained in-core threads (where CPUs execute multiple logical threads of executions, which the operating system would see as two different CPUs, but only switching in between threads when the executing thread needs to halt, for instance for memory access), may degrade lock performance even further if the lock owner, trying to relinquish the lock, is associated to one thread in the CPU, while the other one loops to acquire the lock. Until the waiter thread yields to the owner thread (and being coarse grained, it might not do for a while), the lock effectively stalls because the owner doesn't get a chance to run.

"Starvation"—When more threads try to access the same lock than there are CPUs available, all the CPUs will end up being busy running tight loops trying to acquire the same lock. This will prevent other threads, whether they are trying to access the lock, or even worse, doing unrelated work, from acquiring CPU resource. Since all CPUs (bar the one associated with the lock owner) will be looping on the lock but not doing any useful work, the whole system will effectively be starved to a grinding halt.

The following pseudo C example in Table 1 illustrates a first test case scenario showing the effect on a system of "starvation". Consider a system where a single thread "work" has to increase a counter in a loop. This thread merely provides some work for the system in order to replicate a real world workload. Multiple other threads "load" have to acquire a lock to modify a structure. These multiple other threads generate load on the lock structure by having to acquire it before they are allowed to modify the shared structure (again, in this example, an integer). As soon as the counter thread "work" has reached a target value, the test finishes.

TABLE 1

```
        static void *
work(void *args)
{
    int seed = time(NULL);
    int t;
    for (; counter_w < target_w;)
    {
        counter_w++;
        if ((rand_r(&seed) % yield_rate) == 0)
            <yield>
    }
}
static void *
load(void *args)
{
    int seed = time(NULL);
    int c, t;
    for (; counter_w < target_w;)
    {
        <lock mutex>;
        for (t = delay_l; t; t--)
            <assember noop>;
        counter_l++;
        <unlock mutex>;
        for (t = delay_u; t; t--)
            <assembler noop>;
        if ((rand_r(&seed) % yield rate) == 0)
            <yield>;
    }
}
```

Figure 2:
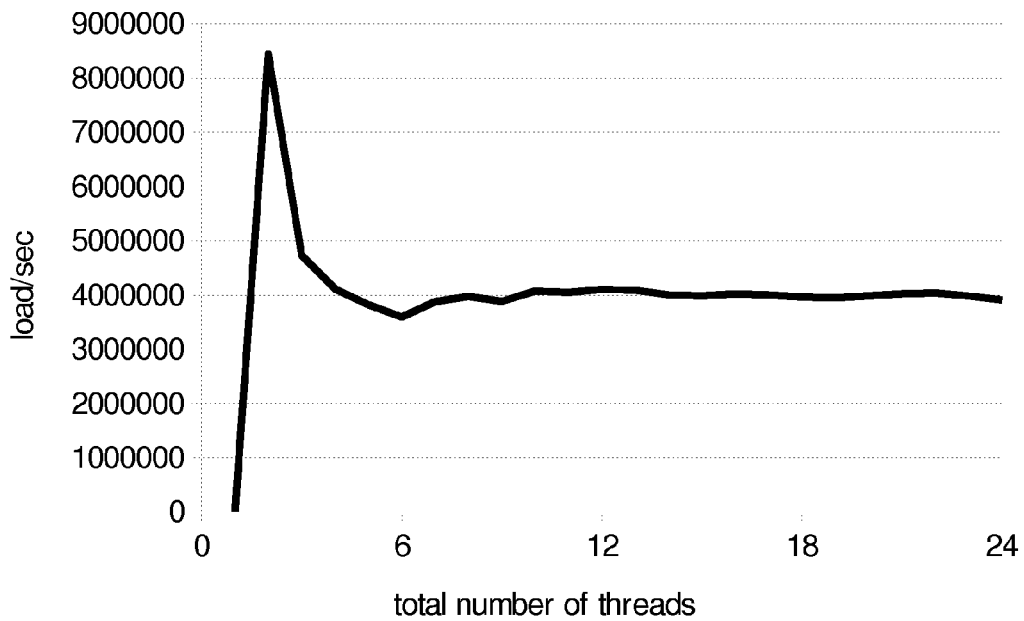
FIG. 2 shows a graph of throughput versus total number of threads in the first test case scenario.
Figure 3:
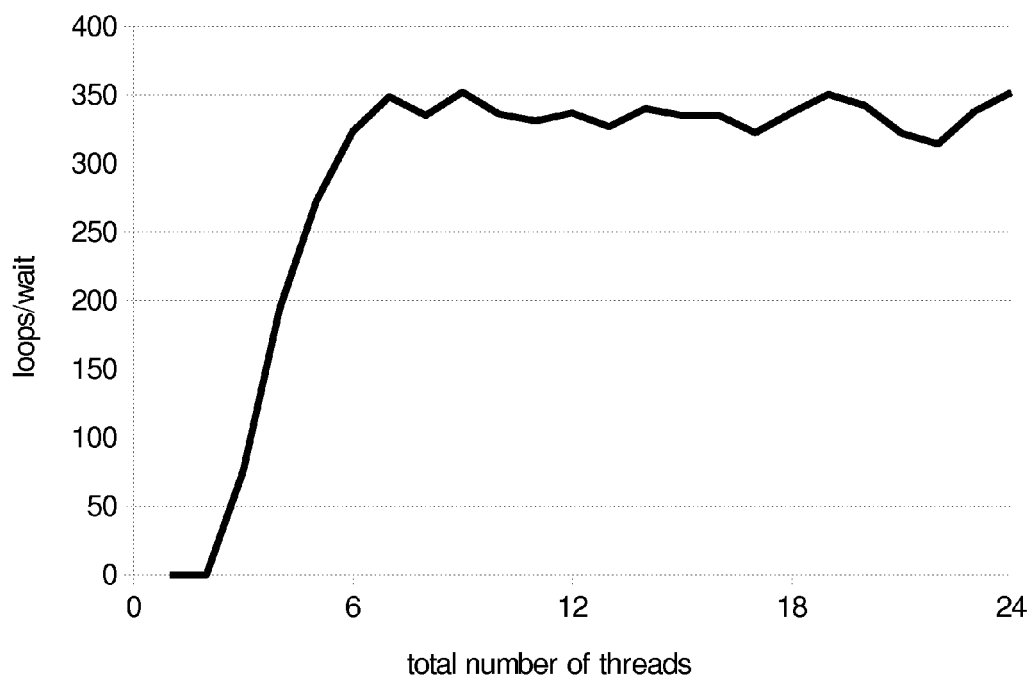
FIG. 3 shows a graph of the number of busy loops per lock attempt in the first test case scenario.

FIGS. 1 to 3 have been created using the above test case scenario, over ten million increments with the "load" threads using a "Test, Set and Test, Back off" busy lock algorithm. Referring to FIG. 1, the graph shows the test case run time versus the total number of threads, both counter and multiple other threads. While there is a CPU available for the counter thread to run on, the test case run time, that is the time taken for the counter thread, is constant and small. As soon as the total number of threads exceed the number of available CPUs (6, in this example), the counter thread struggles to find CPU resources to run on and the time for the test case to complete increases forty fold. The total number of threads is the one counter thread and the multiple other threads. The test case run time increases by an equal amount each time the number of active threads exceeds a multiple of the available CPUs, that is a multiple of six in this example.

Referring to FIG. 2, the graph shows the throughput through the lock versus the total number of threads, both counter and multiple other threads. Throughput is measured as the number of accesses of the lock by "load" threads per second and is shown on the y-axis of the graph. When there is only the counter thread executing, there is no throughput through the lock. When there is one other thread waiting for the lock, the throughput is high. When the number of threads waiting for the lock exceeds one, the throughput through the lock halves.

Referring to FIG. 3, the graph shows the number of busy loops per lock attempt versus the total number of threads. With only the counter thread executing or with just one other thread executing the number of busy loops per lock attempt is zero. As soon as there are two other threads executing, the number of busy loops per lock attempt increases. When the number of other threads reaches three, the number of busy loops per lock attempt quadruples.

FIGS. 1 to 3 show the effect that the other "load" threads contending on the lock have on the ability of the counter "work" thread to actually do some work. In principle, the two threads should be completely unrelated, but as the increasing number of "load" threads exceeds the number of available CPUs, the "work" thread will be scheduled less and less as the CPUs will be busy running the "load" threads, who in turn are battling for the lock, but not doing anything useful.

"Convoys"—This side effect is typical of ordered access lock algorithms—such as tickets or lists, for example, MCS or derivatives, such as K42. In these algorithms, each thread has to wait for the previous lock requestor to acquire and relinquish the lock before it is allowed to acquire the lock itself. The net result is that if the lock owner for some reason is delayed in releasing the lock, this delay will propagate to the next waiter. This in turn may cause the next thread to be delayed, which will cause the next thread to be delayed, the chain of delays only being broken when there are no more waiters. In these circumstances the throughput on the lock will be severely affected with each thread appearing to move in step, mimicking the behavior of the preceding one. The lock owner may be delayed in releasing the lock if there is a programming error, that is the lock is acquired for a long time, or if there is an operating system issue, that is the lock owning thread is preempted by the operating system and no access is possible until the operating system returns that thread to a running state.

A further side effect is "Thundering herd and passive locks". This is the "Thundering herd" side effect mentioned above, but applied to passive locks. As mentioned above, passive locks employ a busy lock and a queue, the busy lock being acquired when the passive lock needs to be acquired, and each waiting thread appending itself to the lock queue if the passive lock is not available. A further problem with thundering herds is that the passive lock owner, which now wants to release the lock, has to acquire the busy lock in order to do so. In order to acquire the busy lock, the passive lock owner has to fight with other threads trying to acquire the same busy lock. If let through first, one of the 'would be' lockers who have not yet managed to append themselves to the queue would have the chance of acquiring the lock straight away. This makes the "Thundering herd" side effect substantially worse.

Under normal circumstances, when only a few threads at most might be trying to acquire the same lock at the same time, and individual locks are dormant more often than they are not dormant, the side effects detailed above are negligible, however there are circumstances when, due to either programming errors or unreasonable demands made by the application, individual locks become a bottleneck. When this happens, the lock throughput quickly reaches unacceptable levels and other threads are quickly starved for prolonged periods of time, bringing the whole system to a standstill.

While the correct way to fix individual bottlenecks is to make sure that application requests on individual resources are reasonable and to code the use of individual locks to be as short, efficient and limited as possible, individual bottlenecks are hard to find by code inspection and are normally identified in the field, once a specific threshold load on the lock has been reached. This is normally too late to prevent any corrective action on the individual lock and forces on application users prolonged periods of down time, lasting until the triggering load diminishes to a level the individual lock can cope with.

With modern multi-core CPUs and virtual machine environments, these bottlenecks are seen more frequently. The virtual machines scheduler can schedule the virtual CPU running the lock holder off the physical CPU. The application running in the virtual machine (VM) environment has no control over the VM scheduler and gets stuck waiting for that virtual CPU to be scheduled again. Embodiments of a busy lock and a passive lock for embedded load management provide a direct replacement for spin locks and mutexes that reduce side effects under stress, and, in particular, try to address starvation.

In some embodiments, in a busy lock, the ability to measure the number of spinning threads waiting at any given loop on the lock is embedded within the lock. At selected intervals, each thread waiting on the lock gauges the load on the lock, and if this exceeds a preset value (for example, as a fraction of the number of available CPUs), the thread voluntarily yields in favor of other threads in the system's ready queue, to restart spinning once scheduled to run again. As more threads yield, the load on the busy lock dips below the preset threshold allowing threads not involved with the busy lock in question to use, for their own purposes, the CPU resources freed by the lock.

Any one or more of the following logical actions may be taken to insure that voluntary yielding is effective and fair. The presence of threads in the ready queue can be tested for before yielding, as lack of ready threads renders voluntary yielding pointless. Threads that are known to hold another busy lock can be barred from yielding to avoid deadlocks. Threads that have already voluntarily yielded do not yield again, except in very specific circumstances. Where the busy lock algorithm used is ordered (for example, tickets), threads do not yield if the preceding thread has yielded (again, except in exceptional circumstances), in order to avoid triggering yielding convoys. For the same class of algorithms, threads that are very far in the queue, or very close to obtaining the lock, do not yield either.

A mechanism is provided, for those classes of algorithms where threads acquire lock resources, for threads to return lock resources to the lock, so as not to trigger stalls due to yielding threads holding resources needed by the lock. By way of example, for a ticket locking algorithm, individual tickets have to be returned, passed to following threads or burned before a thread yields, since once the lock owner increases the display counter and it now matches the ticket held by a sleeping thread, all subsequent threads have to wait for the lock owner to resume execution, with a stall possible if this never happens.

In some embodiments, in a passive lock, the lock algorithm chosen uses a sequence of two busy locks. A thread acquiring the passive lock has to acquire both busy locks, the outer lock first, and a two thread inner lock after that. The passive lock owner only acquires the two thread inner lock. This gives the lock owner precedence on the busy lock over all other threads, allowing it to free the passive lock without having to contend with possible thundering herds. The owner of the outer lock has a vested interest to defer to the thread owning the passive lock, because once the lock is freed, it is the first in line to acquire the inner lock and has a very high chance to obtain the passive lock itself without having to adding itself to a queue on the passive lock and subsequently yield. If the thread didn't defer to the passive lock owner, it would definitely find the passive lock busy, and the only option available would be to queue and sleep, which is definitely more time consuming.

When releasing the passive lock, the lock owner measures the load on the outer busy lock. If this load exceeds a preset threshold value, there is a high chance that the first thread in the lock queue, once woken up, will find the passive lock already acquired by another thread (which was already spinning on the busy lock at the time the first queued waiter was being woken up). If this is the case the only option available to the newly woken up first waiter is to add itself at the end of the waiting queue and yield again. In the description that follows, this is referred to as a "retry". The throughput of the passive lock is likely to be affected, because repeated retries are expensive in terms of extra busy locks, queue manipulations and yields. In order to reduce retries, the passive lock owner bequests the passive lock to the first waiter.

In order to reduce other threads adding themselves to the passive lock queue as the newly woken up passive lock owner gets scheduled, the old passive lock owner bequests the busy lock to the new passive lock owner. Forcing the busy waiters to spin rather than queue and yield has the effect of triggering the load control described earlier on the busy lock, allowing threads not involved with the passive lock to get some time share on the CPUs. This also has the effect of temporarily promoting the passive lock to a busy lock, thus improving throughput. By not allowing them to add themselves at the end of the wait list and yield there is a high chance that one of the busy waiters can acquire the lock without yielding as soon as the new passive lock owner releases it.

A mechanism is provided to allow the newly woken up passive lock owner to be scheduled as quickly as possible in order to avoid stalls. Busy lock waiters are alerted to the fact that the busy lock has been transferred to a thread just woken up and will consider yielding, if required, until said thread signals it is executing and the risk of stall is removed.

Embodiments having the features described above are described below as the "Atomic Deli Counter" algorithm. In this context, "Atomic" means that each transaction is "all or nothing". If one part of the transaction fails, the entire transaction fails, and the state is left unchanged. It is roughly modeled on the chaos normally seen in supermarket deli counters in Mediterranean European countries, where an (atomic) ticket machine is used, much like in Anglo Saxon bakery stores, but customers are not shy to skip the queue, walk to the counter and politely ask for quick favors, while others, bored, will drop tickets onto the floor and walk away to come back at a later time, and others still keep an eye on the floor hoping to spot better tickets. The locks may include a combination of ticket locks (which inherently provide a measure of the load on the lock itself) as the outer lock, and a variation of the Dekker algorithm as the inner lock (this allows the lock requestor to simply initially test the inner lock, which adds very little cost in the case where the passive lock is not busy at all), and a structure, known as "the floor", where threads about to yield (the bored customers) can drop their ticket for following threads to collect.

The Dekker algorithm is a solution to the mutual exclusion problem in concurrent programming. Two threads use shared memory for communication in order to share a single-use resource without conflict. If two threads attempt to enter a critical section at the same time, the Dekker algorithm will allow only one process to enter, based on which thread's turn it is. If one thread is already in the critical section, the other thread will busy wait for the first thread to exit. This is done by the use of two flags, flag1 and flag2, which indicate an intention to enter the critical section and a turn variable that indicates who has priority between the two threads.

Features of various embodiments include (i) load management embedded in the lock algorithm; (ii) load management on busy lock through voluntary yielding; (iii) lock resources exchange infrastructure to enable voluntary yielding, if required by underlying busy lock algorithm; (iv) passive lock owner having priority on busy lock over other busy lock requesters; (v) N-tier busy lock to implement passive lock priority; and (vi) load management on passive lock through passive and busy lock inheritance.

Figure 4:
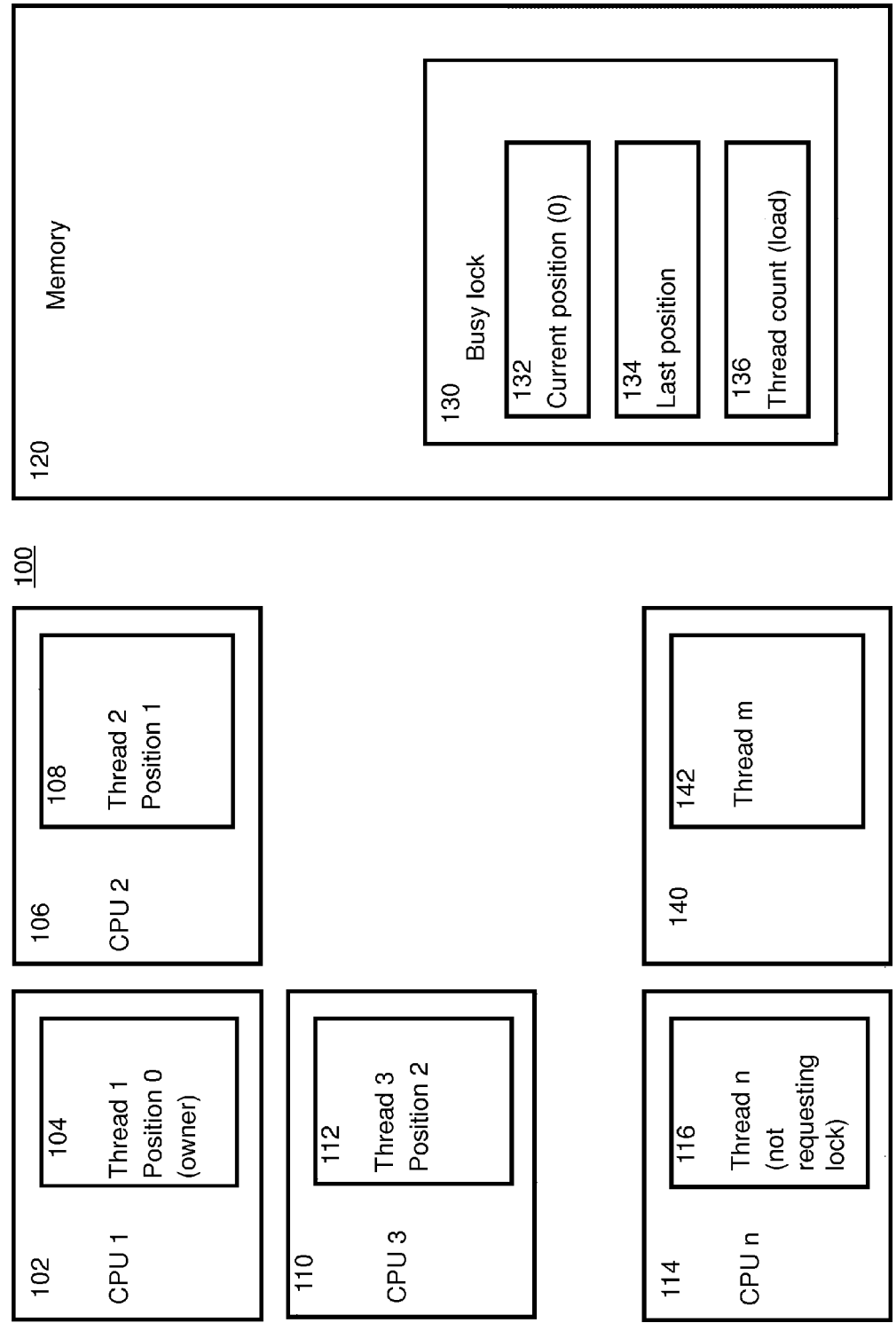
FIG. 4 shows a block diagram of a system for use in conjunction with embodiments of a busy lock and a passive lock for embedded load management.

Referring to FIG. 4, a block diagram of a system 100 in which various embodiments may be implemented is shown. CPU 1 102, CPU 2 106, CPU 3 110 and CPU n 114 are each shown with Thread 1 104, Thread 2 108, Thread 3 112 and Thread n 116 executing on their respective CPUs. Four CPUs 102, 106, 110, 114 only are shown for clarity, there may be any number from two upwards of CPUs 102, 106, 110, 114 in the system 100 of FIG. 1. One thread 104, 108, 112, 116 only is shown executing in each CPU 102, 106, 110, 114 of FIG. 4 for clarity. There may be any number of threads in a system 100 at any one time. Each CPU 102, 106, 110, 114 in the system 100 may only have one thread executing at a time. Threads ready to run in excess of the available CPUs 102, 106, 110, 114 wait in a ready queue for an available CPU. A given CPU 102, 106, 110, 114 may at any time have zero threads executing. FIG. 4 also shows a Thread m 142 located in a Ready queue 140.

Also shown in FIG. 4 is memory 120. Memory 120 contains a busy lock structure 130. In the embodiment of FIG. 4, the busy lock 130 is shown as comprising Current position (0) 132, Last position 134 and Thread count (load) 136. Although the embodiment of FIG. 4 will be described using a plain ticket lock, various embodiments include other implementations of lock, such as generic Set and Test locks or pre-emptable locks. Various embodiments are to load management of locks, independent of what type of underlying lock is used.

Figure 5:
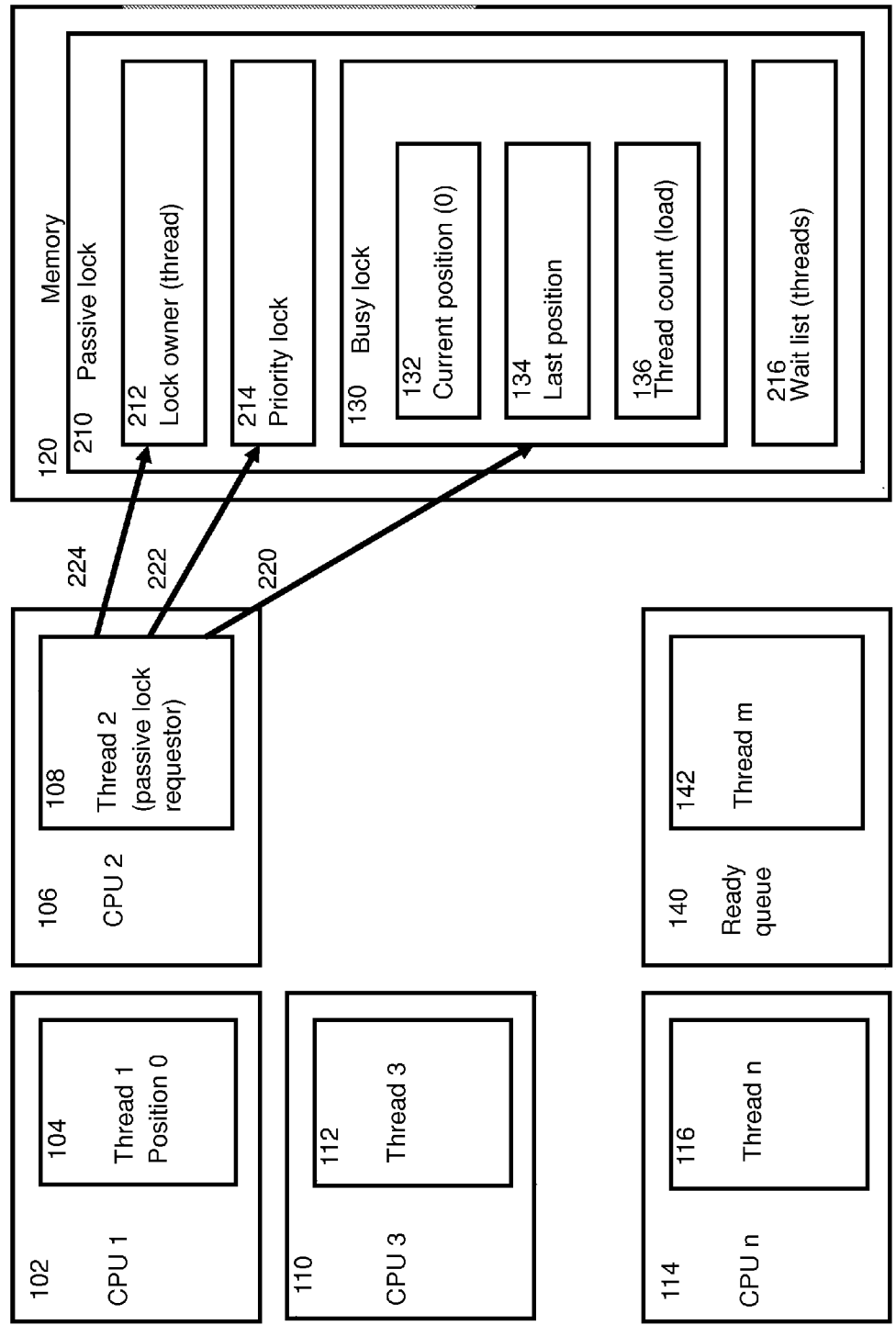
FIG. 5 shows an embodiment of a method for a requestor to acquire a free passive lock.

Referring to FIG. 5, an embodiment of a method for a thread 108 which wishes to acquire a passive lock 210 are shown. FIG. 5 shows a passive lock 210 that comprises an indicator of the Lock owner (thread) 212, the Priority lock 214, the Busy lock 130 of FIG. 4 and a Wait list (threads) 216. FIG. 5 also shows a Thread m 142 located in a Ready queue 140. At block 220, Thread 2 108, the Passive lock 210 requestor, acquires the Busy lock 130. At block 222, Thread 2 108 acquires the Priority lock 214. At block 224, Thread 2 108 sets itself as the Lock owner (thread) 212 in the Passive lock 130 structure.

Figure 6:
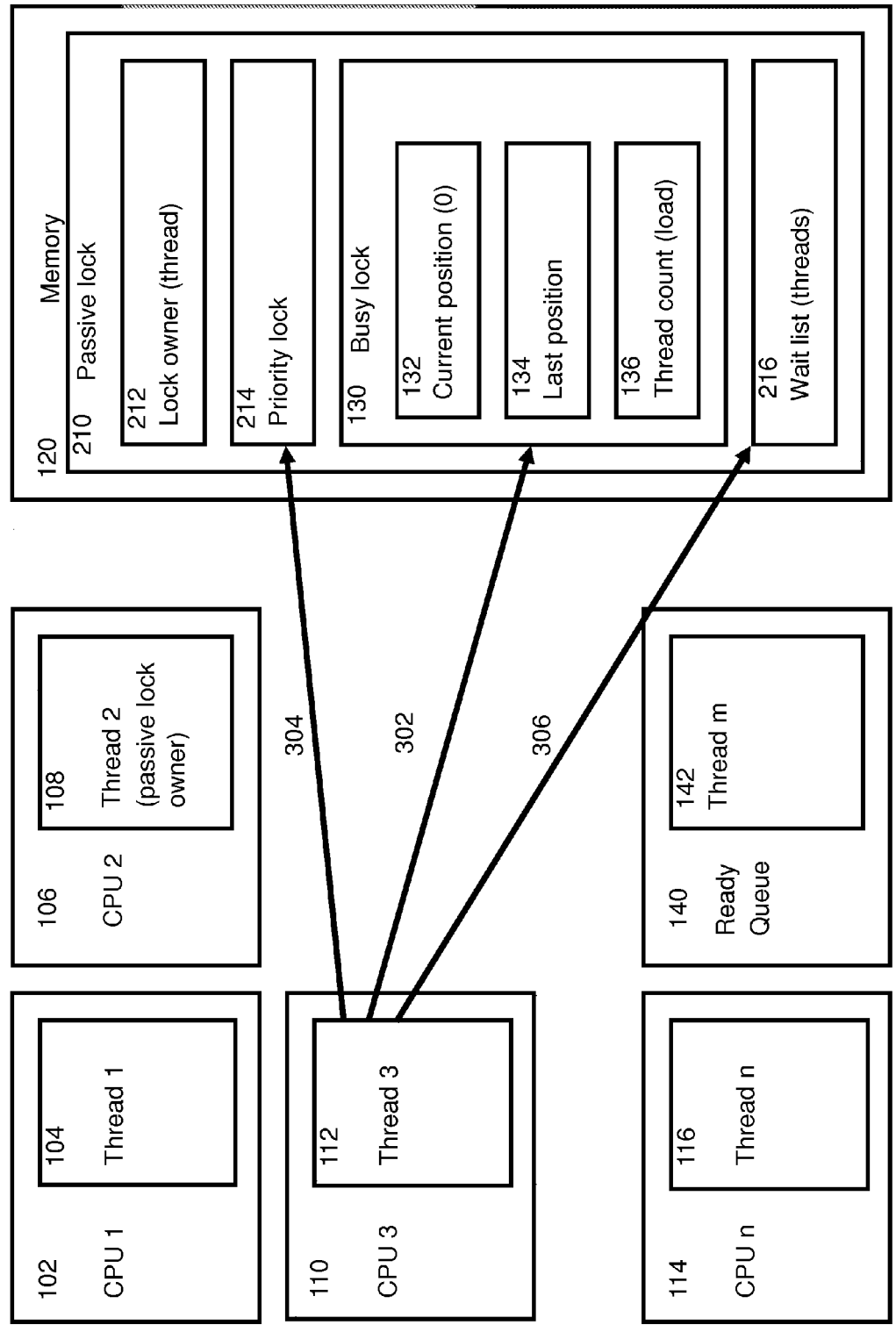
FIG. 6 shows an embodiment of a method for the second thread to access the already acquired passive lock of FIG. 4.

Referring to FIG. 6, a second thread, thread 3 112, running on CPU3 110 is trying to access the already acquired Passive lock 210. Thread 2 108 is the Passive lock 210 owner and appears as the Lock owner (thread) 212. At block 302, Thread 3 112, the thread trying to access the already acquired Passive lock 210, acquires the Busy lock 130. At block 304, Thread 3 112 acquires the Priority lock 214. At block 306, Thread 3 112 appends itself to the Wait list (threads) 216. Thread m 142 located in the Ready queue 140 is ready to run.

Figure 7:
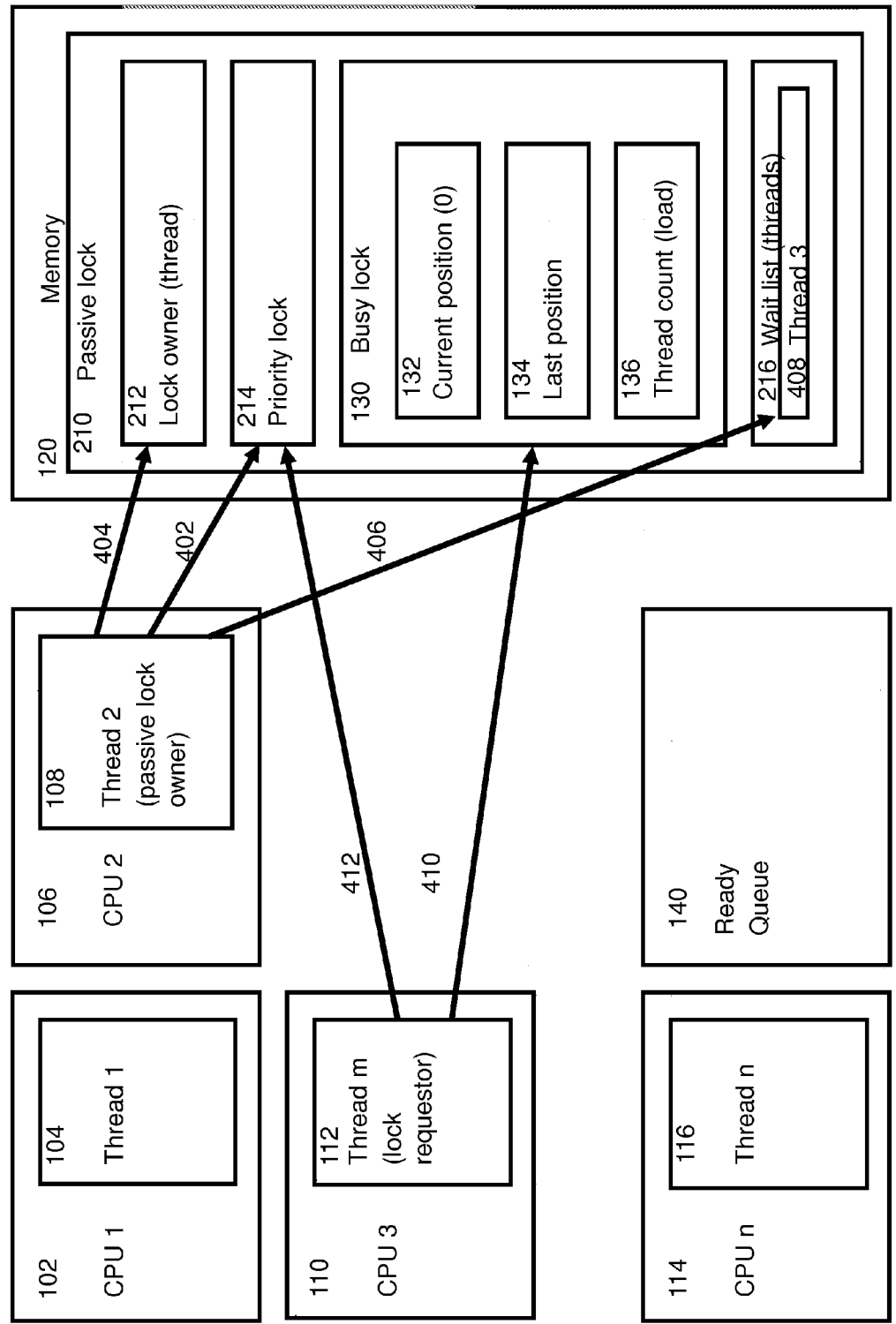
FIG. 7 shows an embodiment of a method for the passive lock owner whilst another thread tries to acquire the passive lock of FIG. 4.

Referring to FIG. 7, an embodiment of a method for the passive lock 210 owner 108 to free the passive lock 210 whilst another thread, Thread m 112, tries to acquire the Passive lock 210 are shown. At block 402, the Passive lock 210 owner 108 acquires the Priority lock 214. At block 404, the Passive lock 210 owner 108 unsets itself as the Lock owner 212. At block 406, the Passive lock 210 owner 108 removes the waiting thread 3 112, 408 from the Wait List 216. Thread 3 112, since the Passive lock 210 is taken, is added to the lock waiting queue. CPU 3 110 is now free, so it picks up thread m 142 from the ready queue 140. The waiting Thread m 112, 408 acquires, at block 410, the Busy lock 130 and at block 412 waits to acquire the Priority lock 214.

Figure 8:
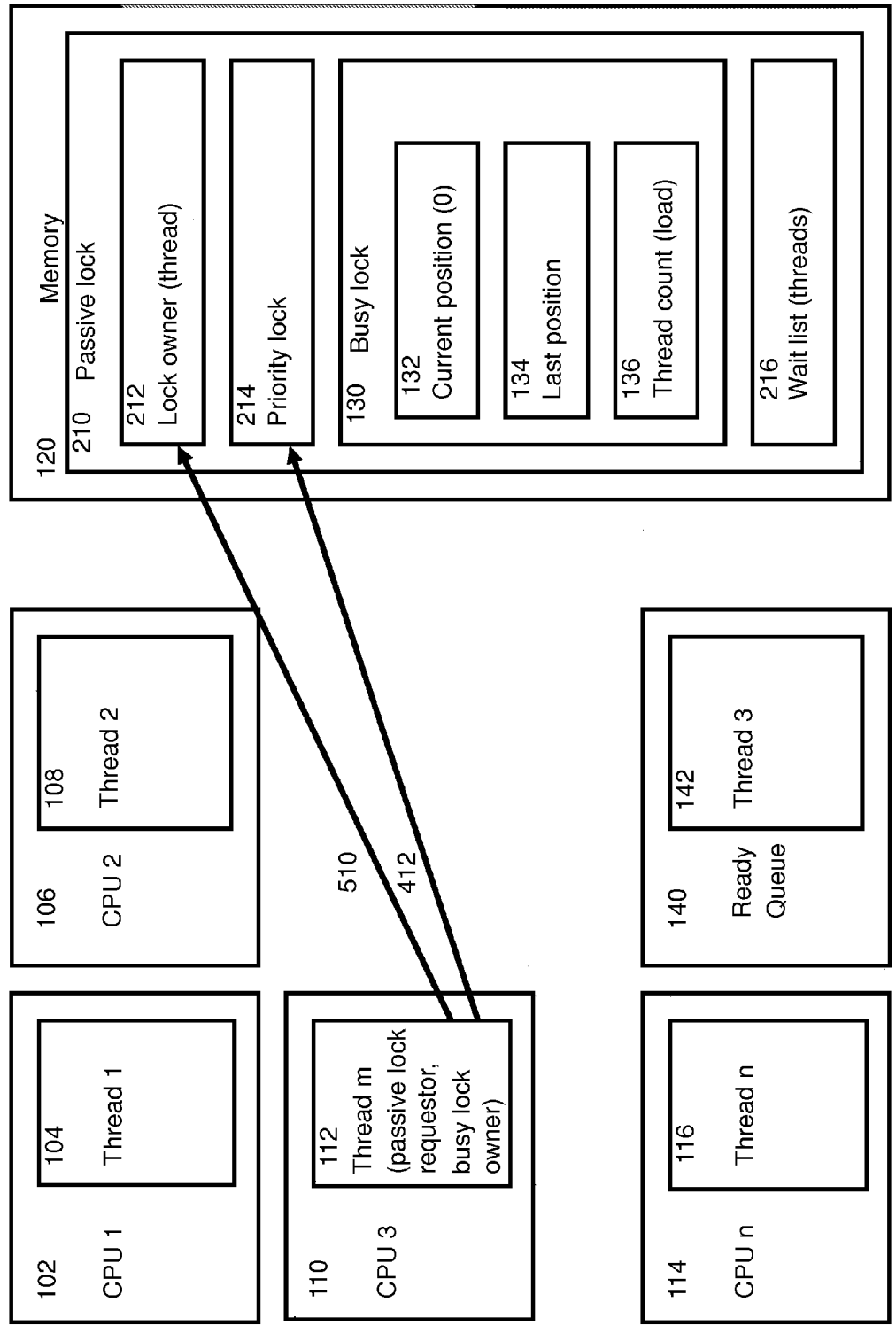
FIG. 8 shows a thread released from the wait list moved to the ready queue of FIG. 4.

Referring to FIG. 8, Thread 3 112, which was removed from the Wait list 216 at block 406, is moved to the Ready Queue 140. Thread m 112, at block 412, waits until it has acquired the Priority lock 214. At block 510, Thread m 112 sets itself as the Lock owner 212. The lock owner has freed the lock and has woken up the first waiter, thread 3 112. Since there are no free CPUs, thread 3 112 is in the ready queue 140 waiting to execute to try to acquire the lock again. At the same time, thread m, running on CPU 3 110, now wants to acquire the Passive lock 210. This scenario will lead to a "retry". Thread m has not stopped running on CPU 3 110.

A high level embodiment of a ticket based algorithm will now be described, first using pseudo code that is shown in Table 2, then with reference to FIGS. 9 to 15. In the pseudo code of Table 2, numbers have been added at the left margins to identify the corresponding element in FIGS. 9 to 15.

TABLE 2

```
602  busy_lock_t::=
604      volatile int display;
606      volatile int ticket;
608      volatile int flag1;
610      volatile int flag2;
612      volatile int threshold;
614      volatile int floor_count;
616      volatile int floor;
620  passive_lock_t::=
622      busy_lock_t lock;
624      int owner;
626      thread_t waiter;
630  thread_t::=
632      int flags;
634      int thread_id;
636      thread_t next;
deli_busy_lock (busy_lock_t lock)::=
704      -- get next ticket incrementing atomically lock.ticket
706      -- set load testing interval counter
708      -- while current ticket != lock.display
710          -- if a cluster of tickets is found on the floor immediately preceding current ticket
712              -- increment tickets held by number of tickets found on the floor
```

TABLE 2-continued

```
714          -- set current ticket to minimum ticket found on the floor
716          -- empty floor
718          -- if load testing interval has elapsed
720              -- reset load testing interval counter
722              -- if load higher than preset lock.threshold and is fair for thread to yield or passive lock owner needs to be scheduled
724                  -- drop ticket cluster on the floor
726                  -- yield
728                  -- acquire new ticket
730          -- if more than one ticket held
732              -- drop extra tickets on the floor
deli_priority_lock(busy_lock_t lock)::=
804      -- set lock.flag1 to zero
806      -- set lock.flag2 to one
808      -- barrier
810      -- read lock.ticket
812      -- while lock.flag1 is zero and lock.display not our ticket
             -- loop
814      -- set thread.flags to mark that priority busy locked is owned
deli_priority_wait (busy_lock_t lock)::=
904      -- set lock.flag1 to zero
906      -- barrier
908      -- while lock.flag2 is non zero
910          -- if lock.flag1 is zero
912              -- set it to one
914      -- set lock.flag1 to zero
deli_busy_unlock (busy_lock_t lock)::=
1004     -- if thread owns priority busy lock
1006         -- set lock.flag2 to zero
1008         -- unset thread.flags
             -- else
1010         -- if lock.flag2 is non zero and lock.flag1 is zero
1012             -- set lock.flag1 to one
1014         -- increment lock.display
deli_passive_lock (passive_lock_t lock)::=
1104     -- deli_busy_lock(lock.lock)
1106     -- deli_priority_wait(lock.lock)
1108     -- if lock.owner is non zero
             -- do
1110             -- append to lock.waiter
1112             -- deli_busy_unlock(lock.lock)
1114             -- yield
1116             -- if lock.owner is set to thread.thread_id
1118                 -- flag on lock.lock that waiter scheduling no longer needed
                     -- break out of do-while loop
1120             -- deli_busy_lock(lock.lock)
1122             -- deli_priority_wait(lock.lock)
1124         -- while lock.owner is non zero
1126     -- set lock.owner to thread.thread_id
1128     -- deli_busy_unlock(lock.lock)
deli_passive_unlock(passive_lock_t lock)::=
1204     -- deli_priority_lock(lock.lock)
1206     -- set lock.owner to 0
1208     -- if lock.waiter is set
1210         -- extract first waiter from lock.waiter
1212         -- if lock.lock.ticket - lock.lock.display > lock.lock.threshold
1214             -- set threads.flags to not own busy lock
1216             -- set waiter.flags to own busy lock
1218             -- flag on lock.lock that waiter needs to be scheduled
             -- else
1220             -- deli_busy_unlock(lock.lock)
1222         -- wake up waiter
             -- else
1220         -- deli_busy_unlock(lock.lock)
```

In the first embodiment of a busy lock, a thread does not yield while the lock is not available, and instead the thread loops until the lock is free.

Routine deli_busy_lock( ) is used by threads wanting to acquire a busy lock. The busy lock algorithm has load control embedded and each thread attempting to acquire the lock will voluntarily yield and try later if the number of threads trying to acquire the lock exceeds a preset fraction of the CPUs available. Routine deli_busy_unlock( ) is used by the thread that owns the lock to release it, thus allowing other threads looping in routine deli_busy_lock( ) (if there are any) to acquire it. To support passive locks, described below, with embedded load control, the thread has to release both the busy lock and an inner priority lock, if this busy lock is used to control a passive lock.

In the second embodiment of a passive lock, the thread, upon finding the lock taken, appends itself to a list of waiter threads and yields, to be woken up when the lock is available again.

The entry point for threads wanting to acquire passive locks is routine deli_passive_lock( ). This routine acquires the busy lock (passive_lock_t.lock) by calling routine deli_busy_lock( ) and routine deli_priority_wait( ) in sequence, to give priority to the passive lock owner, if there is one. If the passive lock is available, it sets the owner to itself, releases the busy lock calling deli_busy_unlock( ) and continues. Otherwise it appends itself to the waiting list and yields. Every time it has been woken up, it checks if it owns the busy lock, in which case, it releases and exits. If it does not own the busy lock, it repeats the whole process again. Routine deli_passive_unlock( ) is used by the thread that owns the lock to release it and to wake up any waiters. This routine first calls routine deli_priority_lock( ) to have priority access to the busy lock (passive_lock_t.lock) controlling the passive lock. If no waiter is present it simply releases the passive lock (by unsetting passive_lock_t.owner) and then releases the busy lock by calling routine deli_busy_unlock( ). Otherwise, it extracts the first waiter from the list, and checks the lock on the load. If the load exceeds a preset threshold, it passes the busy and passive load to the waiter and wakes it up. Otherwise it releases the passive lock (passive_lock_t.owner) and the busy lock (passive_lock_t.lock) by calling routine deli_busy_unlock( ) and resumes the waiter.

The implementation of the priority lock is such that all the cost of locking it rests firmly with the passive lock owner, and not with other threads. When acquiring the passive lock or appending oneself to the waiting list, the cost of acquiring the priority lock is negligible and no performance penalty is encountered, compared to existing passive locks, during normal operation. Since the passive lock owner doesn't have to go through the busy lock, placing the priority lock's operating cost on it doesn't really equate to a penalty, thus the overall cost of executing this passive lock according to various embodiments is equivalent to existing ones.

Figure 9:
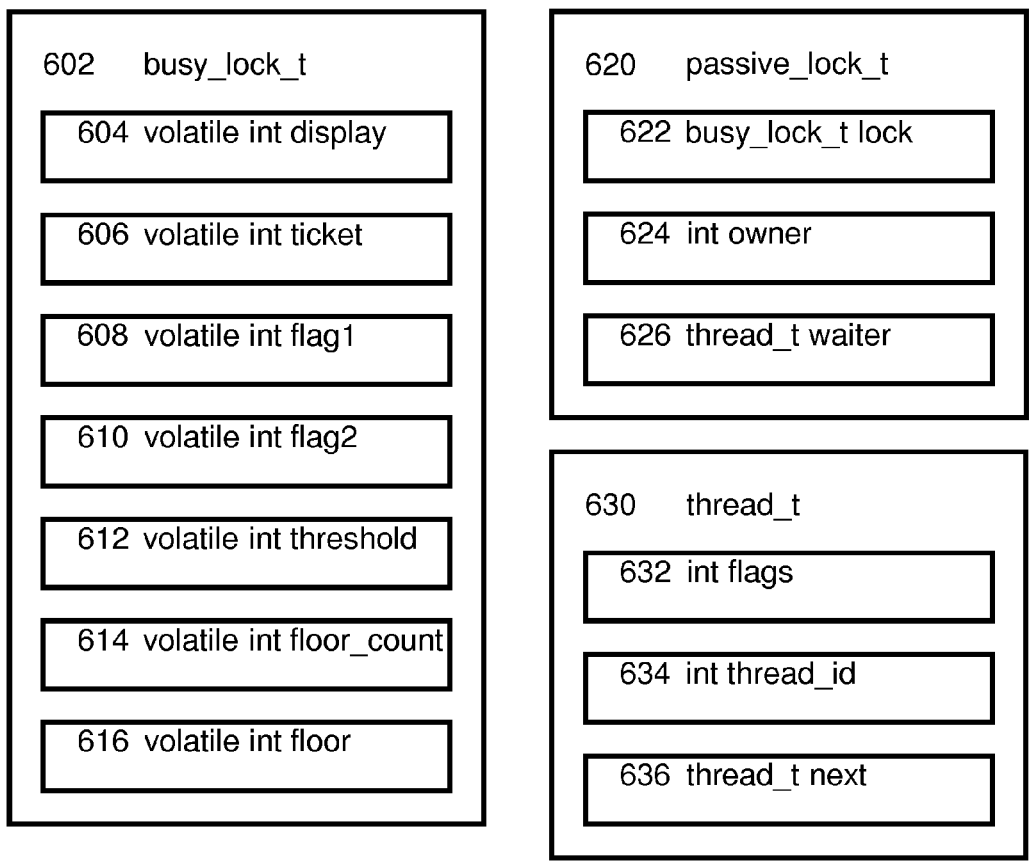
FIG. 9 shows a block diagram of examples of data structures used in embodiments of a busy lock and a passive lock for embedded load management described below with reference to FIGS. 10 to 15.

FIG. 9 shows a block diagram of the data structures used in various embodiments that are described below with reference to FIGS. 10 to 15. Data structure busy_lock_t 602 comprises variables, of type volatile integer, display 604, ticket 606, flag1 608, flag2 610, threshold 612, floor count 614 and floor 616. Data structure passive_lock_t 620 comprises a variable, of type busy_lock_t, lock 622, a variable, of type int, owner 624 and a variable, of type thread_t, waiter 626. Data structure thread_t 630 comprises variables, of type int, flags 632 and thread_id 634 and a variable, of type thread_t, next 636. The embodiments are not limited to the particular data types shown. It is possible to use wider or smaller data types: for instance, ticket locks typically will use shorts rather than integers, as it allows for memory space saving. Integers are only needed if the overall system has more than 65536 CPUs. Flag1 and Flag2 can be chars, as they only contain 2 possible values. A variable or object declared with the volatile keyword usually has special properties related to optimization and/or threading as it can be changed by external code. Generally speaking, the volatile keyword is intended to prevent the compiler from applying certain optimizations, such as saving a value in a temporary location and using the temporary location instead, which it might have otherwise applied because ordinarily it is assumed variables cannot change value "on their own".

Figure 10A:
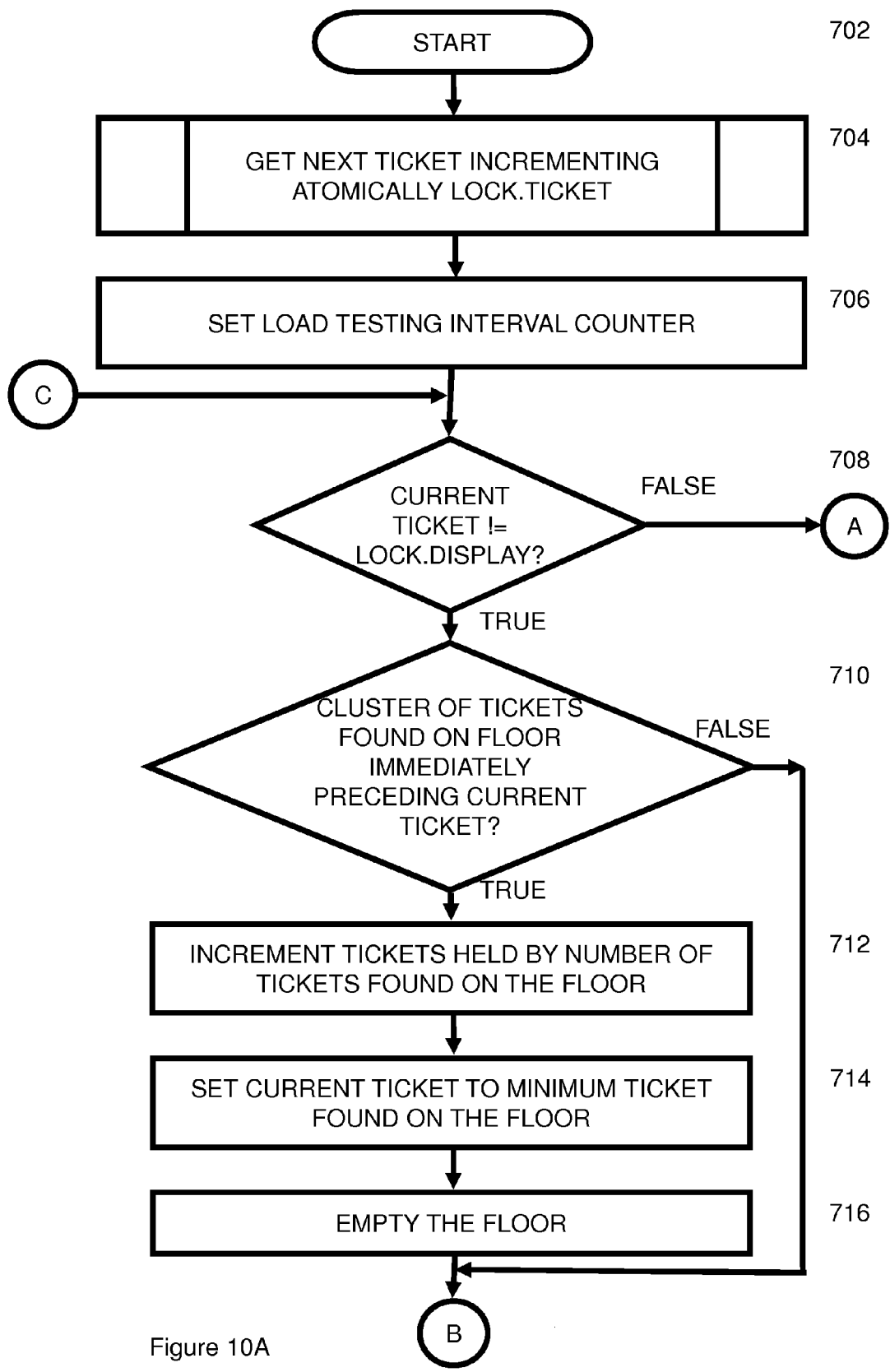
FIGS. 10A and 10B show a flow diagram of a deli_busy_lock( ) routine used by threads wanting to acquire a busy lock and having load control embedded therein.
Figure 10B:
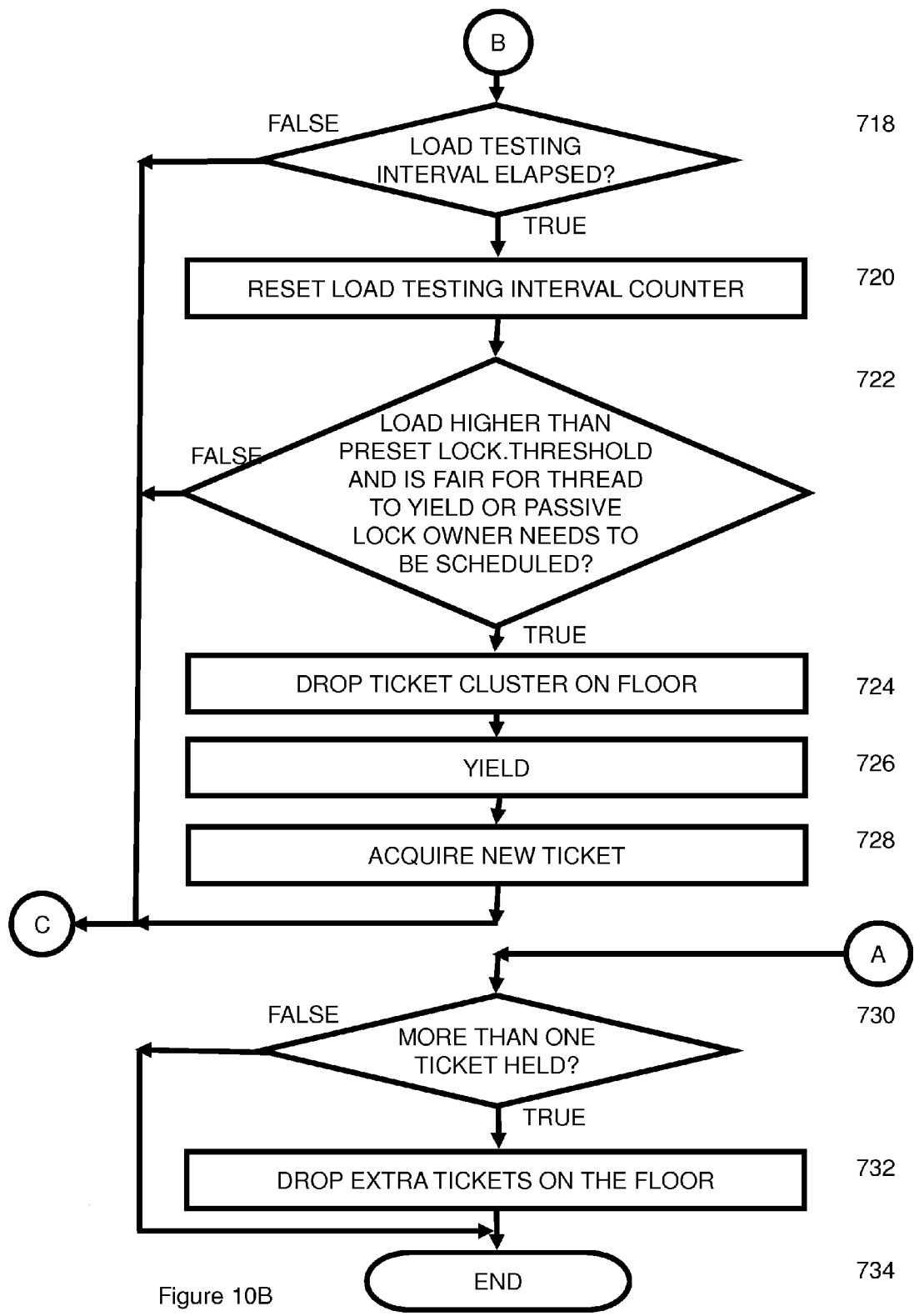

Referring to FIG. 10, which comprises FIGS. 10A and 10B, a flow diagram of a deli_busy_lock( ) routine used by threads wanting to acquire a busy lock and having load control embedded therein is shown. Each thread attempting to acquire the lock will voluntarily yield and try later if the number of threads trying to acquire the lock exceeds a preset fraction of the CPUs available.

Referring to FIG. 10A, the method starts at block 702. At block 704, a next ticket is obtained and the variable ticket 606 in the busy_lock_t 602 data structure lock ticket is incremented atomically. At block 706, a load testing interval counter is set. At block 708, a check is made to see if the current ticket is not equal to the variable display 604 in the busy_lock_t 602 data structure. If the current ticket is equal to the variable display 604 in the busy_lock_t 602 data structure, that is, the check is false, then processing proceeds through connector "A" to block 730. If the current ticket is not equal to the variable display 604 in the busy_lock_t 602 data structure, that is the check is true, then processing proceeds to block 710. At block 710, a check is made as to whether there is a cluster of tickets found on the floor immediately preceding the current ticket. If there is not a cluster of tickets found on the floor immediately preceding the current ticket, that is the check is false, then processing proceeds through connector "B" to block 718. If there is a cluster of tickets found on the floor immediately preceding the current ticket, that is the check is true, then processing proceeds to block 712. At block 712, the number of tickets held is incremented by the number of tickets found on the floor. At block 714, the current ticket is set to the minimum ticket found on the floor. At block 716, the floor is emptied of tickets. Processing proceeds through connector "B" to FIG. 10B.

Referring to FIG. 10B, which includes two flow diagrams, one that includes blocks 718 through 728 and another that includes blocks 730 through 734, a check is made at block 718 as to whether the load testing interval has elapsed. If the load testing interval has not elapsed, that is the check is false, then processing proceeds to block 730. If the load testing interval has elapsed, that is the check is true, then processing proceeds to block 720. At block 720, the load testing interval counter is reset. At block 722, a check is made as to whether the load is higher than the preset value of the variable threshold 612 in data structure busy_lock_t 602. A check is also made to see if it is fair for the thread to yield or whether the passive lock owner needs to be scheduled. If the load is not higher than the preset value of the variable threshold 612 in data structure busy_lock_t 602 or if it is not fair for the thread to yield and the passive lock owner does not need to be scheduled, that is, the check is false, then processing proceeds to block 730. If the load is higher than the preset value of the variable threshold 612 in data structure busy_lock_t 602 and if it is fair for the thread to yield or the passive lock owner needs to be scheduled, that is, the check is true, then processing proceeds to block 724. At block 724, the ticket cluster is dropped on the floor. At block 726, the thread yields. At block 728, a new ticket is acquired. If processing has come from any of blocks 708, 718, 722 or 728, the block 730 is carried out. At block 730, a check is made as to whether more than one ticket is held. If one ticket is, that is, the check is false, then processing proceeds to block 734. If more than one ticket is held, that is the check is true, then processing proceeds to block 732. At block 732, extra tickets are dropped on the floor, leaving just one ticket held. The routine ends at block 734.

Figure 11:
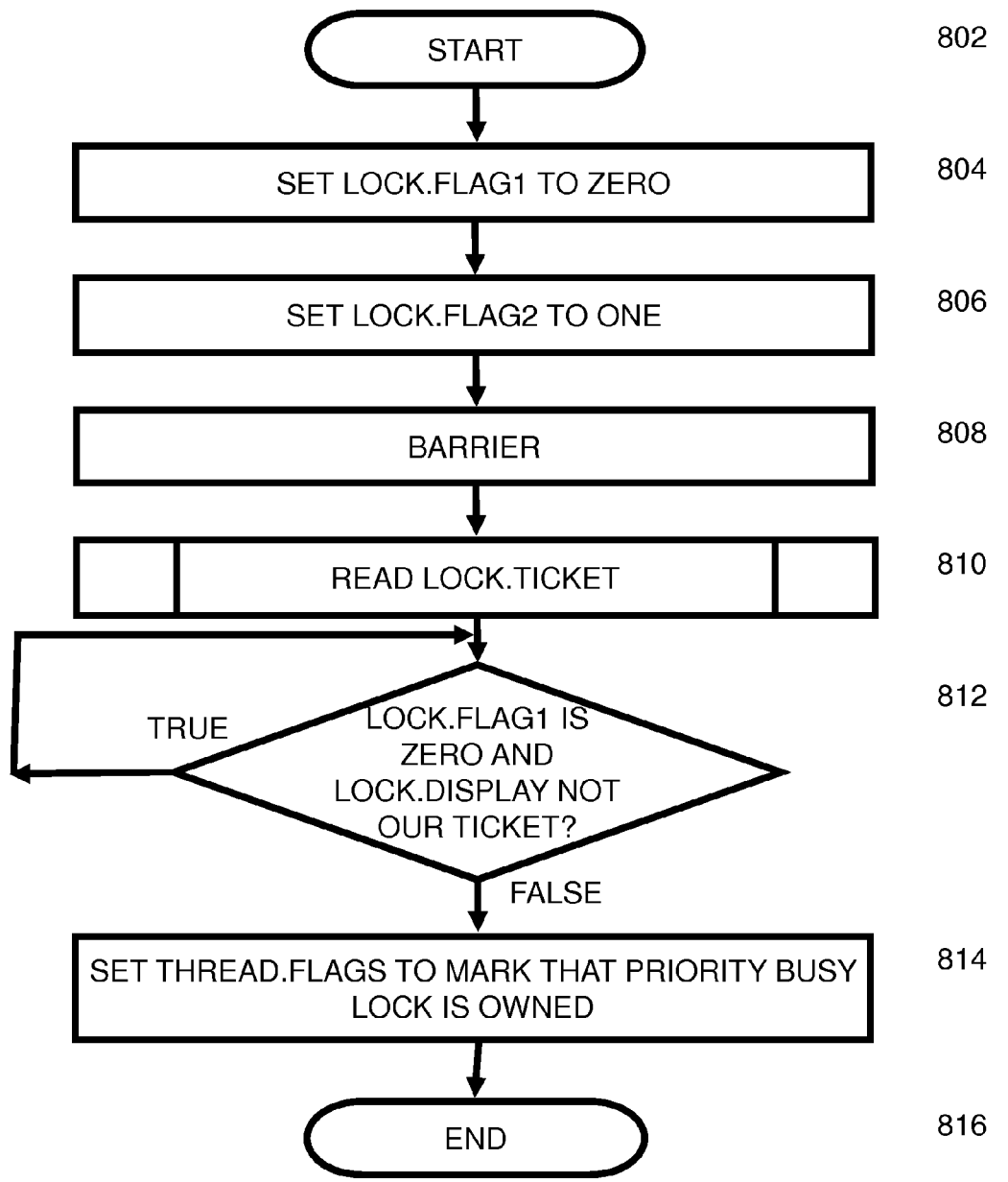
FIG. 11 shows a flow diagram of a deli_priority_lock( ) routine to have priority access to the busy lock (passive_lock_t.lock) controlling the passive lock.

Referring to FIG. 11, a flow diagram of a deli_priority_lock( ) routine to have priority access to the busy lock (passive_lock_t.lock) controlling the passive lock is shown. The routine starts at block 802. At block 804, the variable flag1 608 in data structure busy_lock_t 602 is set to zero. At block 806, the variable flag2 610 in data structure busy_lock_t 602 is set to one. At block 808, a "barrier" operation is executed, that is all writes must be visible to other threads running in other CPUs 102, 106, 110, 114. Blocks 804 and 806 must have completed the writes to memory before processing can proceed to block 810. At block 810, the variable ticket 606 in the data structure busy_lock_t 602 is read. At block 812, a check is made as to whether the variable flag1 608 in data structure busy_lock_t 602 is zero and the variable display 604 in the data structure busy_lock_t 602 is not our ticket. If the variable flag1 608 in data structure busy_lock_t 602 is zero and the variable display 604 in the data structure busy_lock_t 602 is not our ticket, that is the check is true, then processing returns to block 812, that is processing loops until the check is false. If the variable flag1 608 in data structure busy_lock_t 602 is not zero or if the variable display 604 in the data structure busy_lock_t 602 is our ticket, that is the check is false, processing continues to block 814. At block 814, the variable flags 632 in data structure thread_t 630 is set to mark that the priority busy lock is owned. The routine ends at block 816.

Figure 12:
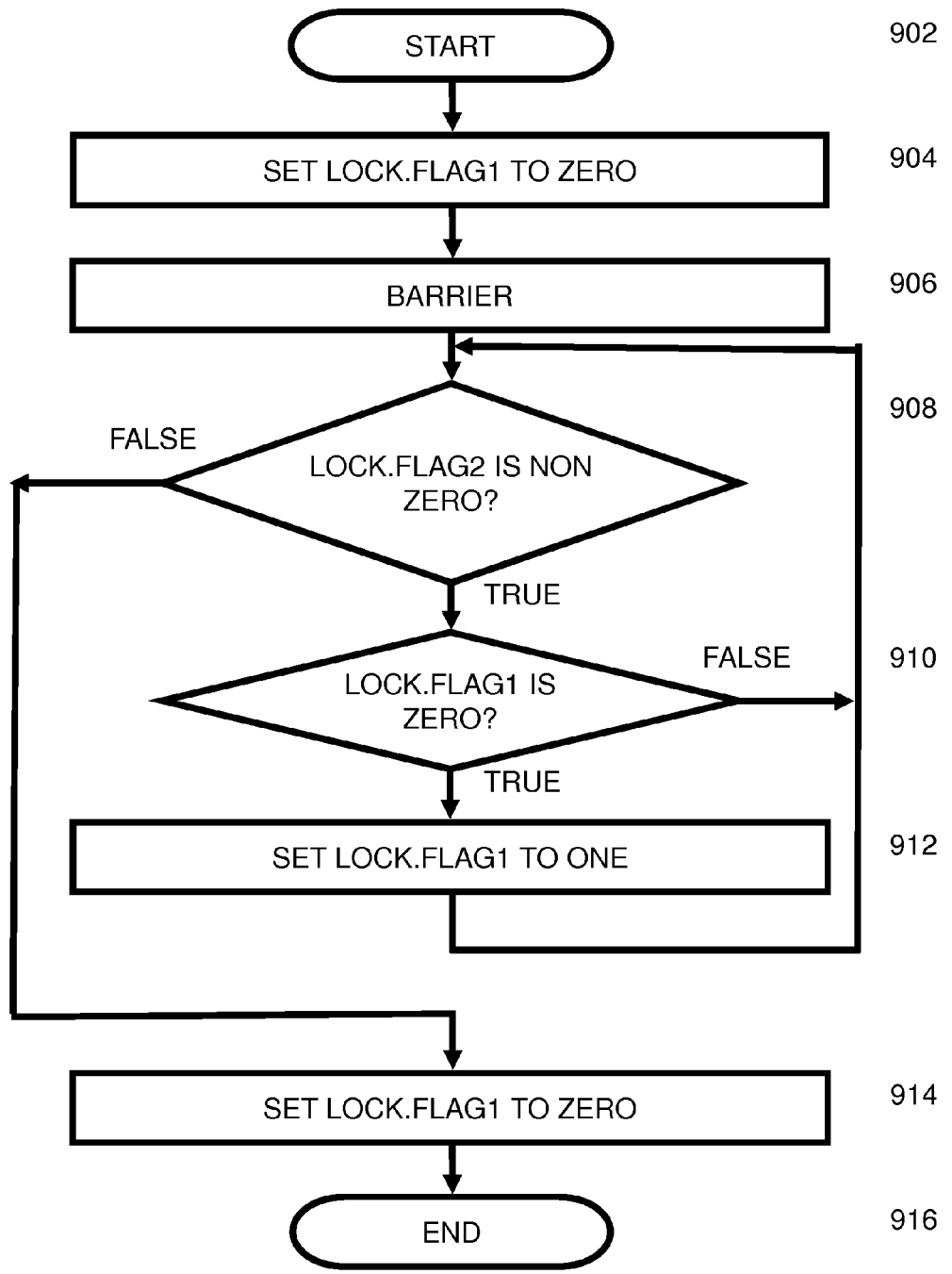
FIG. 12 shows a flow diagram of a deli_priority_wait( ) routine to give priority to the passive lock owner, if there is one.

Referring to FIG. 12, a flow diagram of a deli_priority_wait( ) routine to give priority to the passive lock owner, if there is one, is shown. The routine starts at block 902. At block 904, the variable flag1 608 in data structure busy_lock_t 602 is set to zero. At block 906, a "barrier" operation is executed, which is a point that all threads have to reach before any thread can proceed. At block 908, a check is made as to whether the variable flag2 610 in data structure busy_lock_t 602 is non zero. If the variable flag2 610 in data structure busy_lock_t 602 is zero, that is the check is false, then processing proceeds to block 914. If the variable flag2 610 in data structure busy_lock_t 602 is non zero, that is the check is true, then processing continues to block 910. At block 910, a check is made as to whether the variable flag1 608 in data structure busy_lock_t 602 is zero. If the variable flag1 608 in data structure busy_lock_t 602 is non zero, that is the check is false, then processing returns to block 908. If the variable flag1 608 in data structure busy_lock_t 602 is zero, that is the check is true, then processing continues to block 912. At block 912, the variable flag1 608 in data structure busy_lock_t 602 is set to one. Processing returns to block 908. At block 914, the variable flag1 608 in data structure busy_lock_t 602 is set to zero. The routine ends at block 916.

Figure 13:
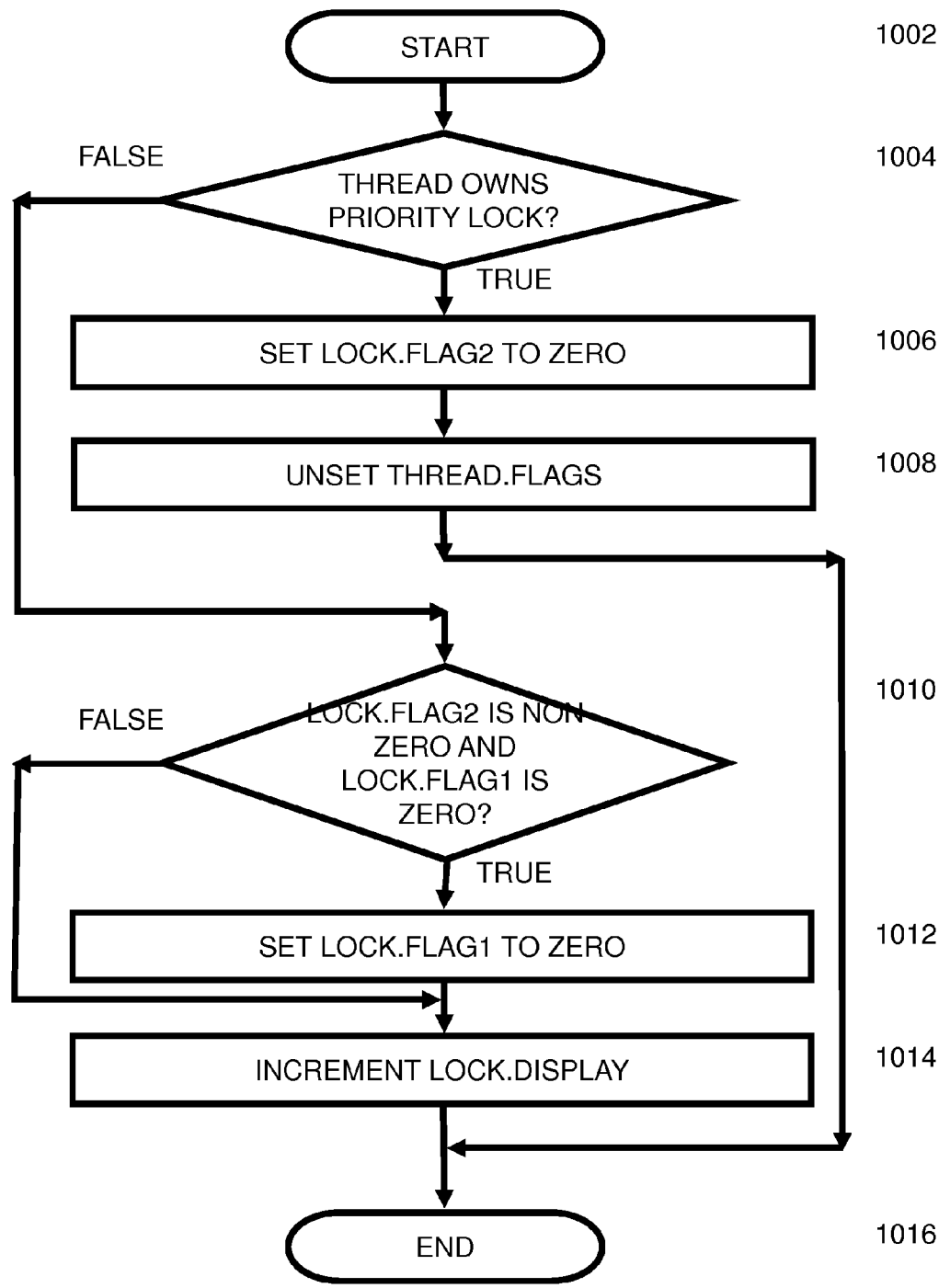
FIG. 13 shows a flow diagram of a deli_busy_unlock( ) routine used by the thread that owns the lock to release it, thus allowing any other threads looping in deli_busy_unlock( ) to acquire it.

Referring to FIG. 13, a flow diagram of a deli_busy_unlock( ) routine used by the thread that owns the lock to release it, thus allowing any other threads looping in deli_busy_unlock( ) to acquire it is shown. In order to support passive locks with embedded load control, both the busy lock and an inner priority lock have to be released, if this busy lock is used to control a passive lock.

The method starts at block 1002. At block 1004, a check is made as to whether the thread owns the priority lock. If the thread does not own the priority lock, that is the check is false, then processing proceeds to block 1010. If the thread owns the priority lock, that is the check is true, then processing continues to block 1006. At block 1006, the variable flag2 610 in data structure busy_lock_t 602 is set to zero. At block 1008, the variable flags 632 in data structure thread_t 630 is unset. The routine ends at block 1016.

If, at block 1004, the thread does not own the priority lock, that is the check is false, then at block 1010, a check is made as to whether the variable flag2 610 in data structure busy_lock_t 602 is non zero and the variable flag1 608 in data structure busy_lock_t 602 is zero. If the variable flag2 610 in data structure busy_lock_t 602 is zero or the variable flag1 608 in data structure busy_lock_t 602 is non zero, that is the check is false, then processing proceeds to block 1014. If the variable flag2 610 in data structure busy_lock_t 602 is non zero and the variable flag1 608 in data structure busy_lock_t 602 is zero, that is the check is true, then processing continues to block 1012. At block 1012, the variable flag1 608 in data structure busy_lock_t 602 is set to zero. At block 1014, the variable display 604 in data structure busy_lock_t 602 is incremented. The routine ends at block 1016.

Figure 14A:
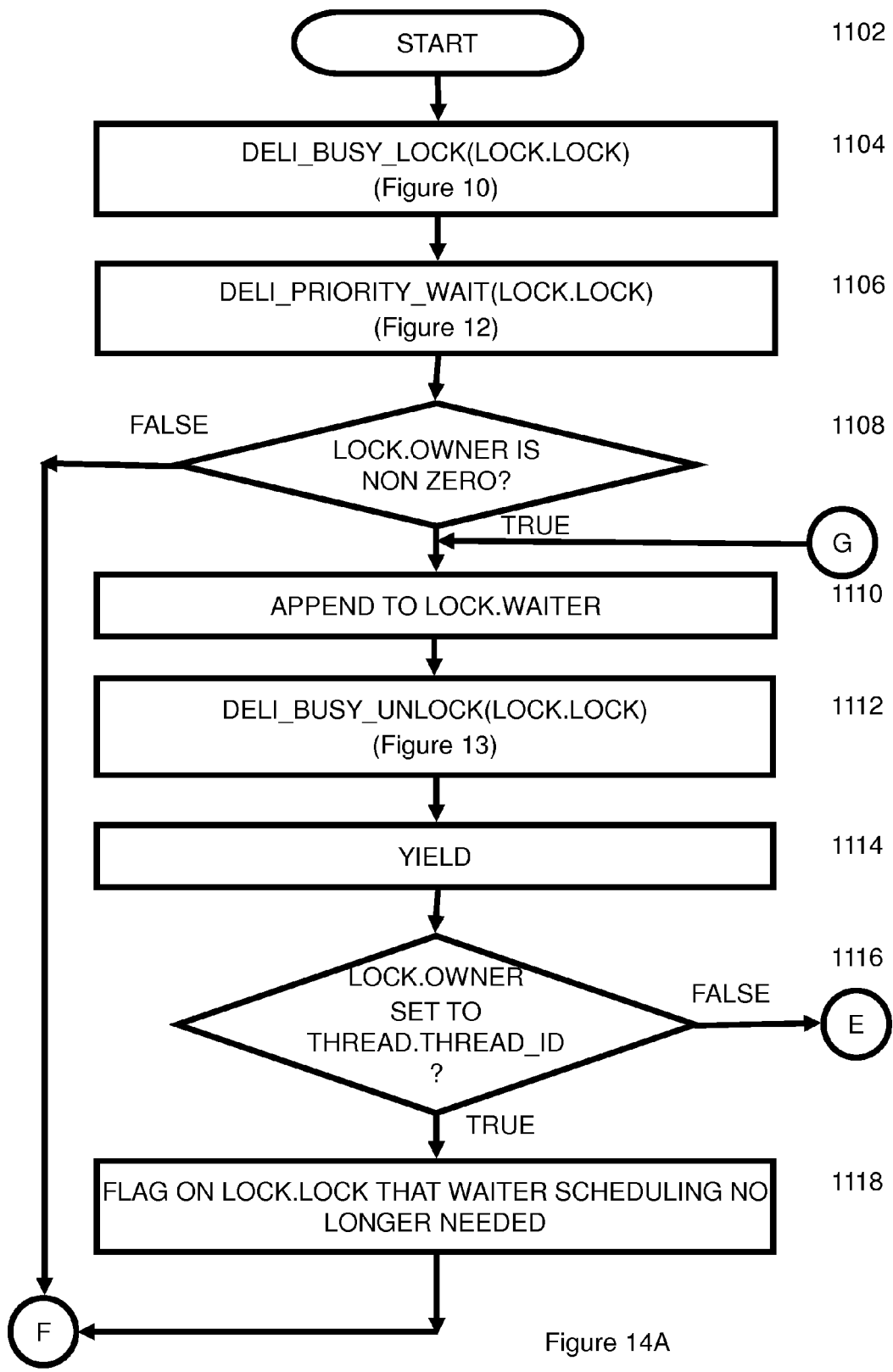
FIGS. 14A and 14B show a flow diagram of a deli_passive_lock( ) routine which is the entry point for threads wanting to acquire passive locks.
Figure 14B:
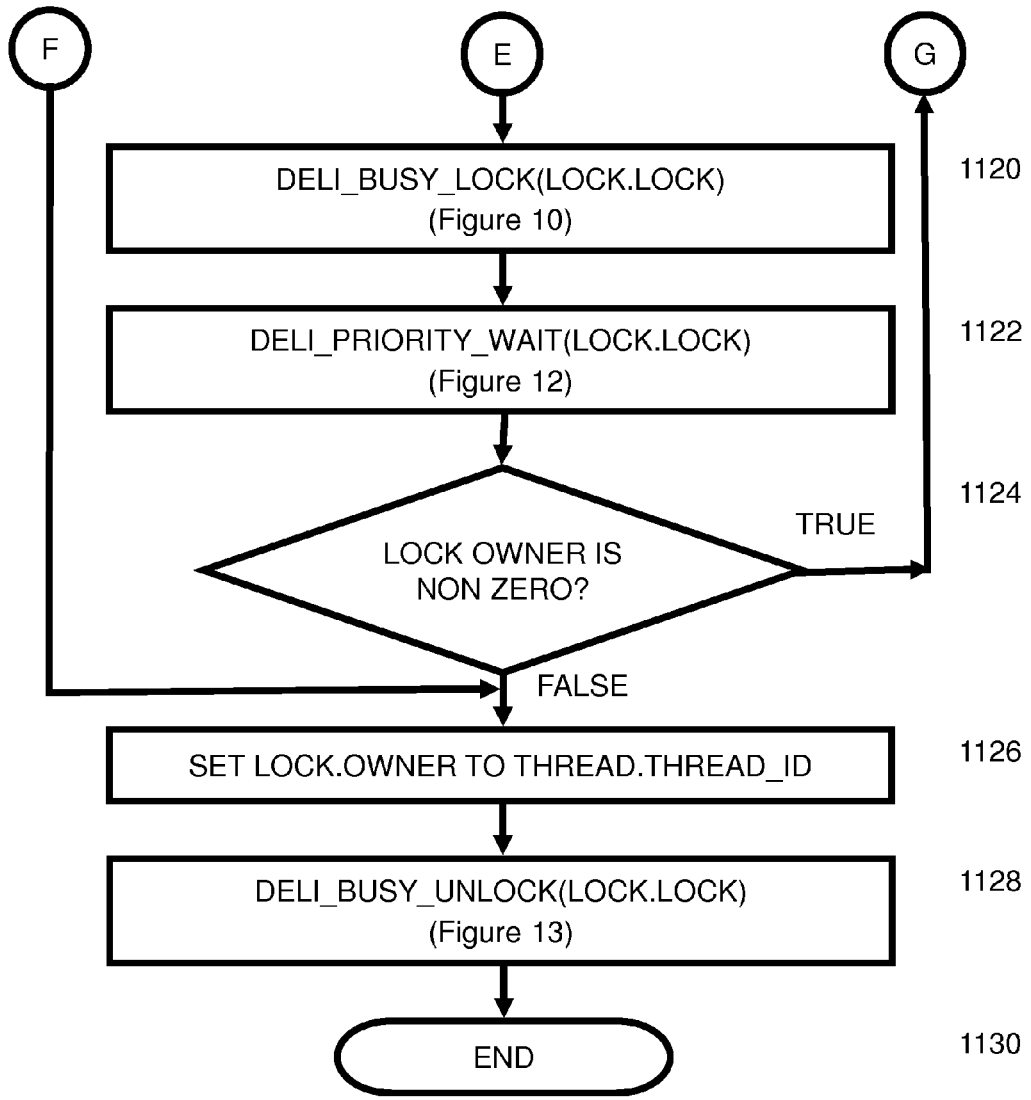

Referring to FIG. 14, which comprises FIGS. 14A and 14B, a flow diagram of a deli_passive_lock( ) routine which is the entry point for threads wanting to acquire passive locks is shown. The deli_passive_lock( ) routine acquires the busy lock (passive_lock_t.lock) by calling deli_busy_lock( ) and deli_priority_wait( ) in sequence, to give priority to the passive lock owner, if there is one. If the passive lock is available, it sets the owner to itself, releases the busy lock calling deli_busy_unlock( ) and continues. Otherwise it appends itself to the waiting list and yields. Every time it has been woken up, it checks if it owns the busy lock, in which case, it releases and exits or it goes to repeat the whole process again.

Referring to FIG. 14A, the method starts at block 1102. At block 1104, routine deli_busy_lock(lock.lock), described above with reference to FIG. 10, is called. At block 1106, routine deli_priority_wait(lock.lock), described above with reference to FIG. 12, is called. At block 1108, a check is made as to whether the variable owner 624 in data structure passive_lock_t 620 is non zero. If the variable owner 624 in data structure passive_lock_t 620 is zero, that is the check is false, then processing proceeds through connector "F" to block 1126. If the variable owner 624 in data structure passive_lock_t 620 is non zero, that is the check is true, then processing continues to block 1110. At block 1110, the thread that is requesting the lock appends itself to variable waiter 626 in data structure passive_lock_t 620. At block 1112, routine deli_busy_unlock(lock.lock), described above with reference to FIG. 13, is called. At block 1114, the thread yields.

At block 1116, a check is made as to whether the variable owner 624 in data structure passive_lock_t 620 is set to thread_id 634 in data structure thread_t 630. If the variable owner 624 in data structure passive_lock_t 620 is not set to thread_id 634 in data structure thread_t 630, that is the check is false, then processing proceeds through connector "E" to block 1120. If the variable owner 624 in data structure passive_lock_t 620 is set to thread_id 634 in data structure thread_t 630, that is the check is true, then processing continues to block 1118. At block 1118, the variable lock 622 in data structure passive_lock_t 620 is used to flag that waiter scheduling is no longer needed.

Referring to FIG. 14B, at block 1120, routine deli_busy_lock(lock.lock), described above with reference to FIG. 10, is called. At block 1122, routine deli_priority_wait(lock.lock), described above with reference to FIG. 12, is called. At block 1124, a check is made as to whether the variable owner 624 in data structure passive_lock_t 620 is non zero. If the variable owner 624 in data structure passive_lock_t 620 is non zero, that is the check is true, then processing returns through connector "G" to block 1110. If the variable owner 624 in data structure passive_lock_t 620 is zero, that is the check is false, then processing continues to block 1126.

At block 1126, the variable owner 624 in data structure passive_lock_t 620 is set to thread_id 634 in data structure thread_t 630. At block 1128, routine deli_busy_unlock(lock.lock), described above with reference to FIG. 13, is called. The routine ends at block 1130.

Figure 15A:
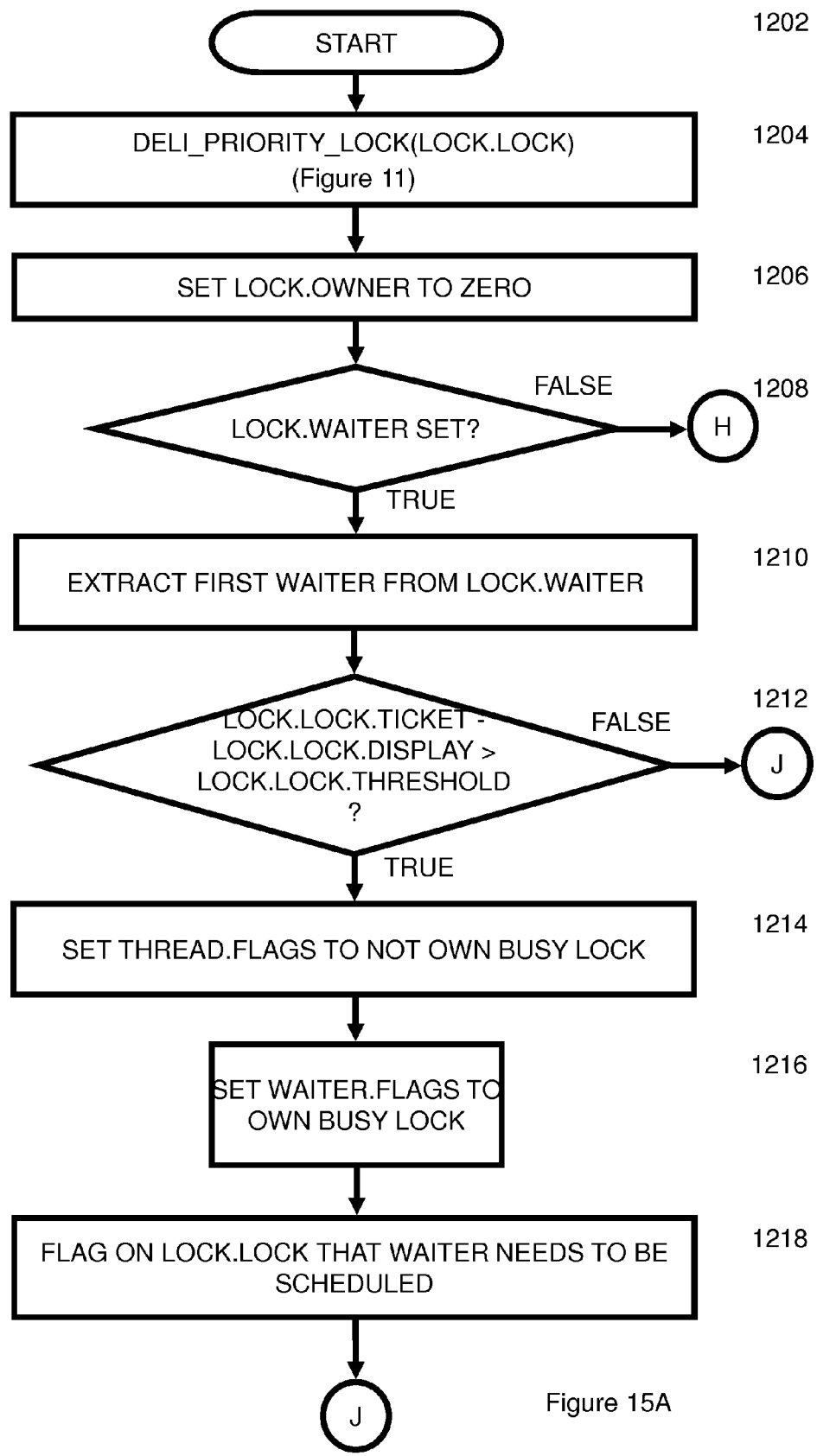
FIGS. 15A and 15B show a flow diagram of a deli_passive_unlock( ) routine used by the thread that owns the lock to release it, wake up any waiters.
Figure 15B:
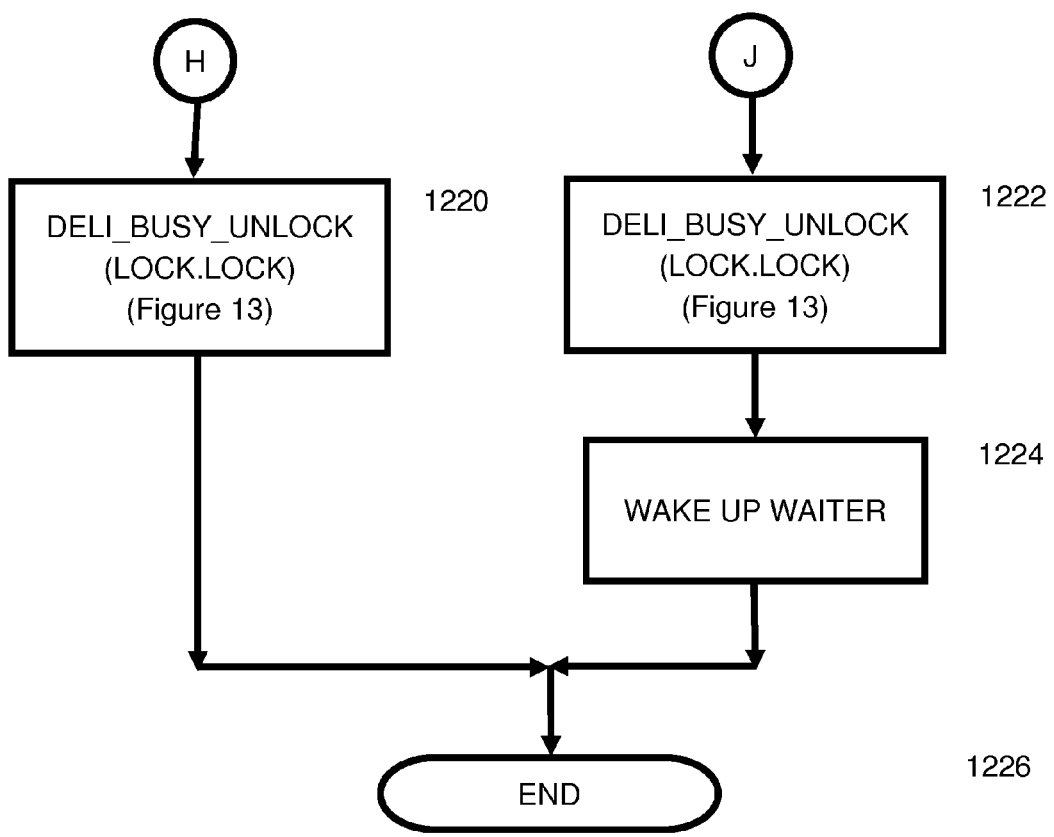

Referring to FIG. 15, which comprises FIGS. 15A and 15B, a flow diagram of a deli_passive_unlock( ) routine used by the thread that owns the lock to release it and wake up any waiters is shown. The deli_passive_unlock( ) first calls deli_priority_lock( ) to have priority access to the busy lock (passive_lock_t.lock) controlling the passive lock. If no waiter is present it simply releases the passive lock (by unsetting passive_lock_t.owner) and then releases the busy lock by calling deli_busy_unlock( ) otherwise, it extracts the first waiter from the list, and checks the load on the lock. If the load exceeds a preset threshold, it passes the busy and passive load to the waiter and wakes it up. Otherwise it releases the passive lock (passive_lock_t.owner) and busy lock (passive_lock_t.lock) by calling deli_busy_unlock( ) and resumes the waiter.

The method starts at block 1202. At block 1204, routine deli_priority_lock(lock.lock), described above with reference to FIG. 11, is called. At block 1206, the variable owner 624 in data structure passive_lock_t 620 is set to zero. At block 1208, a check is made as to whether the variable waiter 626 in data structure passive_lock_t 620 is set. If the variable waiter 626 in data structure passive_lock_t 620 is not set, that is the check is false, then processing proceeds through connector "H" to block 1220. Referring briefly to FIG. 15B, at block 1220, routine deli_busy_unlock(lock.lock), described above with reference to FIG. 13, is called. The routine ends at block 1226.

Referring again to block 1208 in FIG. 15A, if the variable waiter 626 in data structure passive_lock_t 620 is set, that is the check is true, then processing continues to block 1210. At block 1210, the identity of the first waiter is extracted from the variable waiter 626 in data structure passive_lock_t 620. Threads are normally identified by a thread id or a pointer to a thread descriptor structure. The embodiments are not, however, limited to the use of a thread id or a thread descriptor structure. At block 1212, a check is made as to whether the variable ticket 606 minus the variable display 604 is greater than the variable threshold 612, the variables all being located in data structure busy_lock_t 602. If the variable the variable ticket 606 minus the variable display 604 is not greater than the variable threshold 612, that is the check is false, then processing proceeds through connector "J" to block 1222. Referring briefly to FIG. 15B, at block 1222, routine deli_busy_unlock(lock.lock), described above with reference to FIG. 13, is called. At block 1224, the waiting threads are woken up. The routine ends at block 1226.

Referring briefly to block 1212 in FIG. 15B, if the variable ticket 606 minus the variable display 604 is not greater than the variable threshold 612, that is the check is true, then processing continues to block 1214. At block 1214, the variable flags 632 in data structure thread_t 630 is set to not own busy lock. At block 1216, the variable flags in data structure waiter is set to own the busy lock. At block 1218, the thread flags on the variable lock in data structure lock that waiter needs to be scheduled. The routine ends at block 1226.

A first test case scenario showing the effect on a system of "starvation" was described above. Five further test case scenarios will now be described in which performance of embodiments of a busy lock and a passive lock for embedded load management are compared with the performance of a prior art "Test, Set and test, Backoff" algorithm. These test case scenarios are modeled after actual performance degradations seen in the field.

A second test case scenario shows the effect of a bottleneck on a heavily used busy lock. In this scenario, the majority of the active threads ('load threads') engage the busy lock a repeated number of times, while the remaining minority ('work threads') have a fixed amount of work to do and don't use the busy lock. The test terminates when the work threads complete their work. The work threads are fixed in number, while the load threads increase in number.

Figure 16:
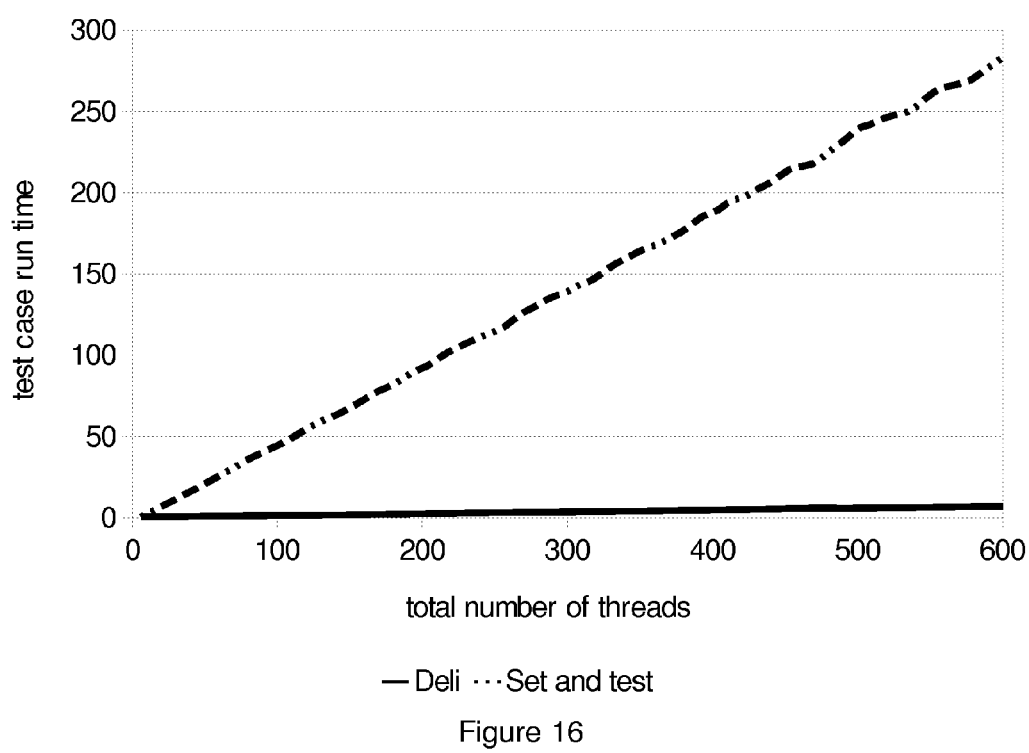
FIG. 16 shows a graph of test case run time versus total number of threads in a second test case scenario in which a majority of load threads cause a bottleneck on a heavily used busy lock delaying a minority of work threads completing their work.

Referring to FIG. 16, the graph shows the test case run time versus the total number of threads, both load and work threads. The "set and test" line, in "dot-dash", shows that as the number of threads increases in a normal Test, Set and Test, Back off scenario the test case duration time increases linearly. In some embodiments, the "Deli" line, in "continuous" line, shows that by sacrificing a fraction of the busy lock throughput, work threads enjoy orders of magnitude more CPU time and the test case completes in a fraction of the time.

Figure 17:
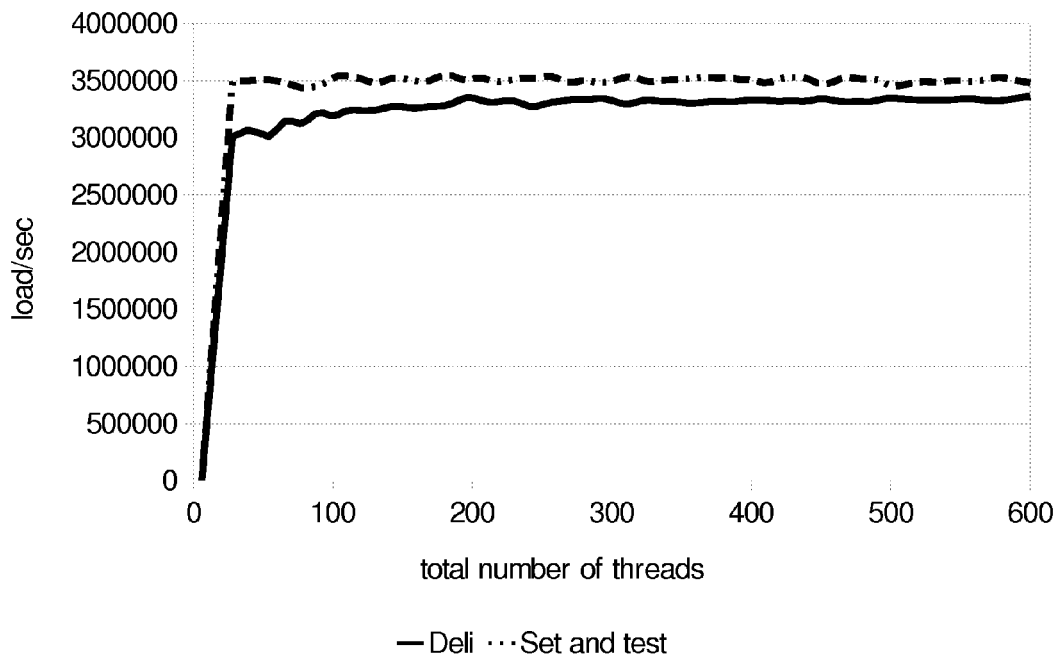
FIG. 17 shows a graph of throughput versus total number of threads in the second test case scenario.

Referring to FIG. 17, the graph shows the throughput through the lock, that is the number of busy loops per lock attempt versus the total number of threads. Throughput is measured as the number of accesses of the lock by "load" threads per second and is shown on the y-axis of the graph. The "set and test" line, in "dot-dash", shows that as the number of threads increases in a normal Test, Set and Test, Back off scenario the throughput through the lock increases rapidly until it reaches a limiting value. In some embodiments, the "Deli" line, in continuous line, shows that by sacrificing a fraction of the busy lock throughput, the throughput through the lock increases rapidly, but to a lower level than the Test, Set and Test, Back Off scenario. The throughput does increase slightly as the number of threads increases, but it never quite reaches the level of the Test, Set and Test, Back Off scenario. This is part of a tradeoff between slightly reduced throughput for the "load" threads versus dramatically improved performance for the "work" threads.

Figure 18:
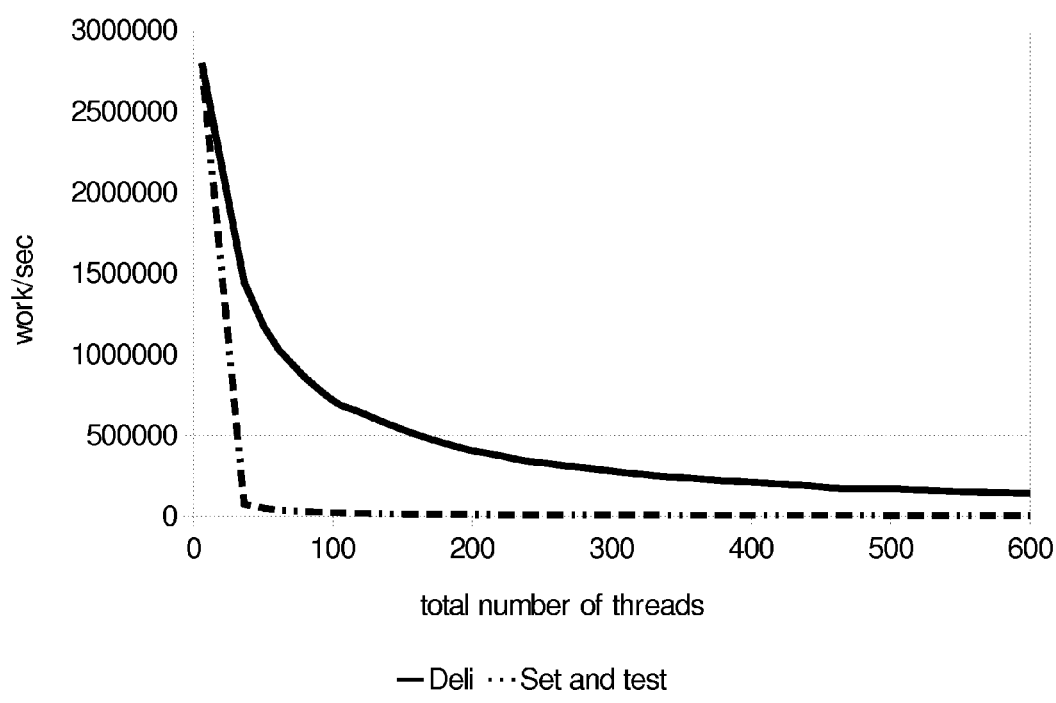
FIG. 18 shows a graph of the work throughput in the second test case scenario.

Referring to FIG. 18, the graph shows the work throughput versus the total number of threads. Work throughput is measured by work operations per second and is shown on the y-axis of the graph. In this scenario, a work operation comprises incrementing a number in order to count the number of work operations and wasting a few CPU cycles to simulate some real work. The "set and test" line, in "dot-dash", shows that as the number of threads increases in a normal Test, Set and Test, Back off scenario the work throughput decreases inversely with a very rapid fall to a very low level. By sacrificing a fraction of the busy lock throughput, work threads enjoy orders of magnitude more CPU time. In some embodiments, the "Deli" line, in "continuous" line, shows that the work throughput decreases at a much lower rate to levels higher than that of the "set and test" line.

A third test case scenario shows the effect of a passive lock being accessed in a cartesian manner. In this scenario, the majority of the active threads ("load threads") need to access a passive lock a fixed number of times, while the remaining minority ("work threads") have a fixed amount of work to do and don't use the busy lock. In this third scenario, the test terminates when the load threads have finished their work. This is in contrast to the second scenario, when the test terminates when the work threads complete their work.

Figure 19:
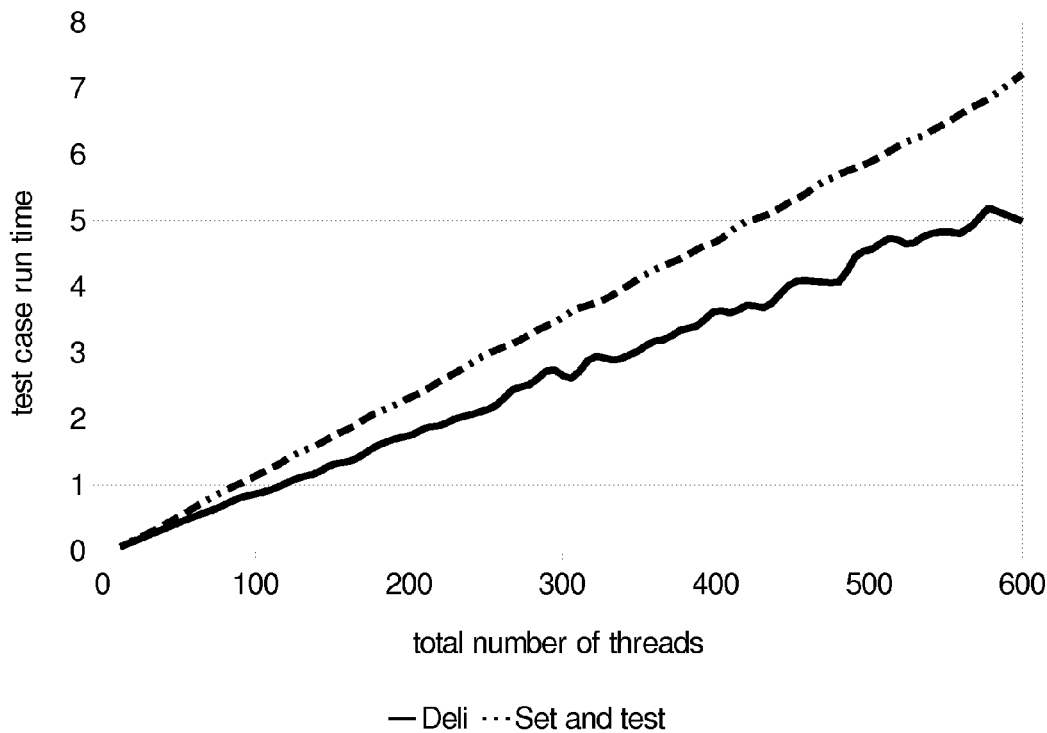
FIG. 19 shows a graph of test case run time versus total number of threads in a third test case scenario in which a passive lock is being accessed in a cartesian manner.

Referring to FIG. 19, taken from a real life customer scenario, about ten thousand load threads are accessing each of five passive locks three thousand times. The total number of lock accesses was 150 million, keeping 128 CPUs busy for in excess of ten minutes. The graph, of a simplified version of the real life customer scenario using 600 threads, shows the test case run time in seconds versus the total number of threads. The "set and test" line, in "dot-dash", shows that as the number of threads increases in a conventional Test, Set and Test, Back off scenario, the test case run time increases linearly. In some embodiments, the "Deli" line, in "continuous" line, also shows a substantially linear increase in test case time for increasing number of total threads. However, the test case run time for some embodiments show an improvement of about 40% in both execution time and passive lock throughput.

Figure 20:
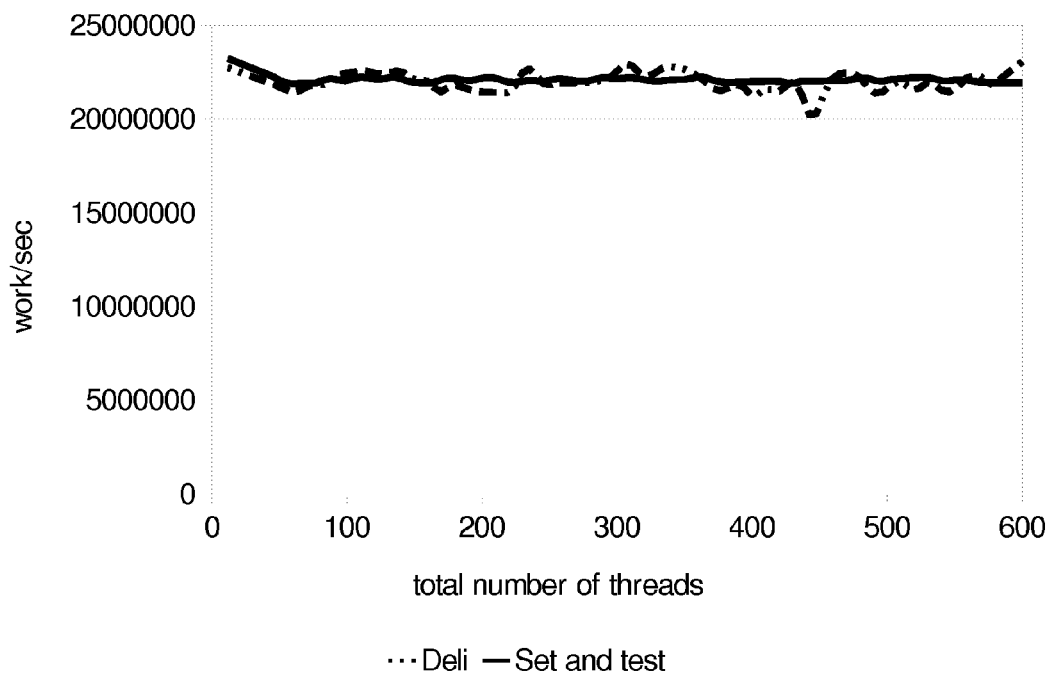
FIG. 20 shows a graph of the work throughput in the third test case scenario.

Referring to FIG. 20, the graph shows the work throughput versus the total number of threads. Work throughput is measured by work operations per second and is shown on the y-axis of the graph. The "Set and test" line, in "dot-dash", shows that as the number of threads increases in a normal Test, Set and Test, Back off scenario the work throughput stays at a substantially constant level. In some embodiments, the "Deli" line, in "continuous" line, shows that the work throughput also stays at a substantially constant very similar to the level of the "Set and test" line. This shows that the improvement of 40% in both execution time and passive lock throughput shown in FIG. 19 is achieved whilst maintaining substantially the same work throughput shown in FIG. 20.

In a fourth test case scenario, a passive lock is modified to include a priority busy lock, but without any load control according to some embodiments. As described above, a passive lock is typically implemented as an inner lock structure protected by an outer busy lock. Releasing a passive lock entails acquiring the outer busy lock again, marking the busy lock as free, removing the first waiter thread from the waiting queue, releasing the outer busy lock and waking up the waiter thread which was just removed from the queue. By allowing the owner of the inner passive lock to have precedence on the busy lock over all other threads, a throughput improvement is achieved, but work thread starvation is massively increased. This fourth scenario shows that implementing a priority busy lock without load control results in the work throughput decreasing rapidly as the total number of threads increases.

Figure 21:
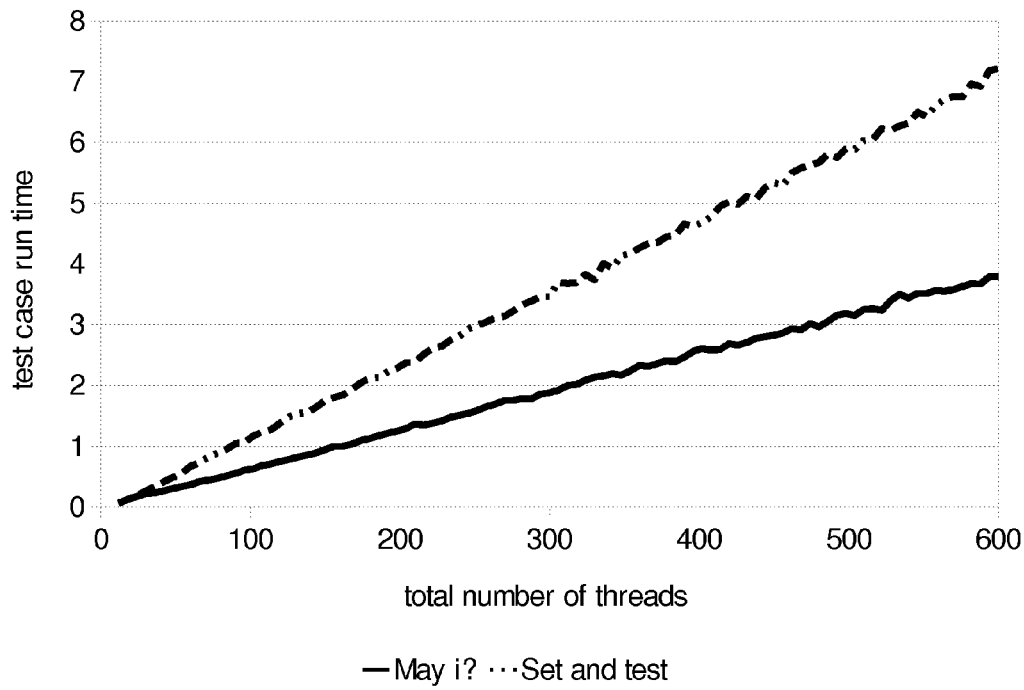
FIG. 21 shows a graph of test case run time versus total number of threads in a fourth test case scenario in which a passive lock includes a priority busy lock, but without any load control according to an embodiment.

Referring to FIG. 21, the graph shows the test case run time versus the total number of threads, both load and work threads. The "set and test" line, in "dot-dash", shows that as the number of threads increases in a normal Test, Set and Test, Back off scenario the test case duration time increases linearly. In the modified priority busy lock, "May I?" in "continuous" line, giving priority on the busy lock to the passive lock owner shows a 100% improvement in load throughput, that is the load threads do the same amount of work in half the time because the passive lock owner does not have to fight a thundering herd on the busy lock. By sacrificing a small portion of the busy lock throughput, work threads enjoy orders of magnitude more CPU time and the test case completes in less time.

Figure 22:
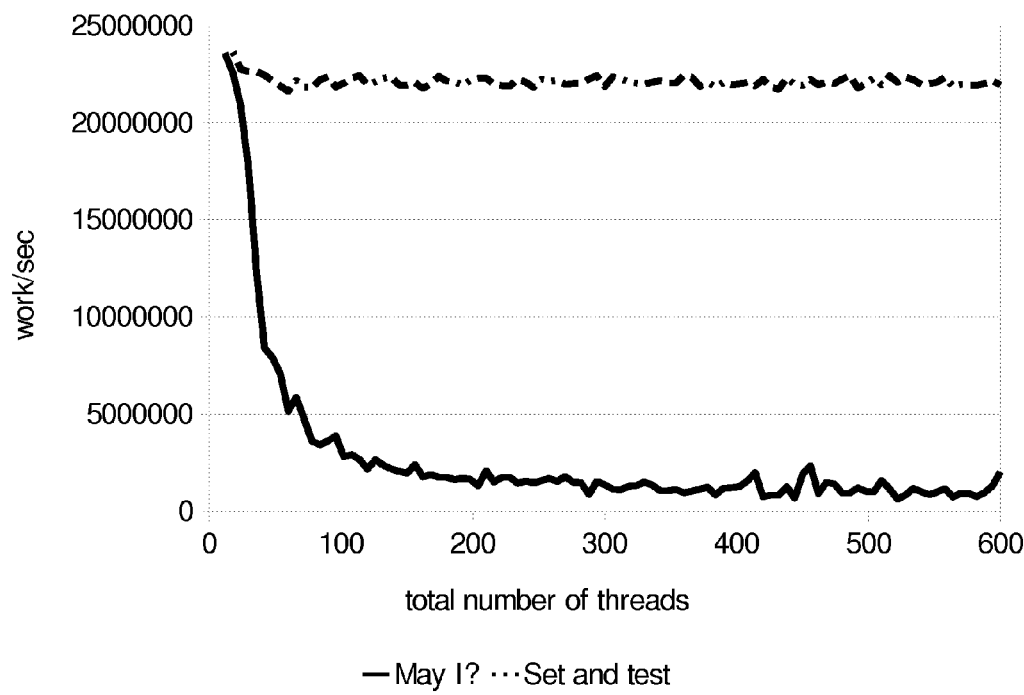
FIG. 22 shows a graph of the work throughput in the fourth test case scenario.

Referring to FIG. 22, the graph shows the throughput through the lock, that is the number of busy loops per lock attempt versus the total number of threads. Throughput is measured as the number of accesses of the lock by "load" threads per second and is shown on the y-axis of the graph. The "set and test" line, in "dot-dash", shows that as the number of threads increases in a normal Test, Set and Test, Back off scenario the throughput through the lock drops initially to a value just below the peak, but settles at a constant high value thereafter. In the modified priority busy lock, "May I?", in continuous line, the throughput decreases rapidly to less than 5% of the peak level as the total number of threads increases.

A fifth test case scenario shows a bottleneck on a heavily used passive lock getting progressively worse as the total number of threads increases. The passive lock is usually held for more than a minimal interval and is already an existing minor bottleneck even at low numbers of total threads. In a real life example of such a slowdown, six thousand transaction per minute quickly reduced to three hundred transactions per minute. In the real life example, 48 CPUs were required to produce this effect. A smaller number of 15 were not sufficient to reproduce this effect. As for the first test case scenario, this test case runs for a specific amount of work done by the few worker threads.

Figure 23:
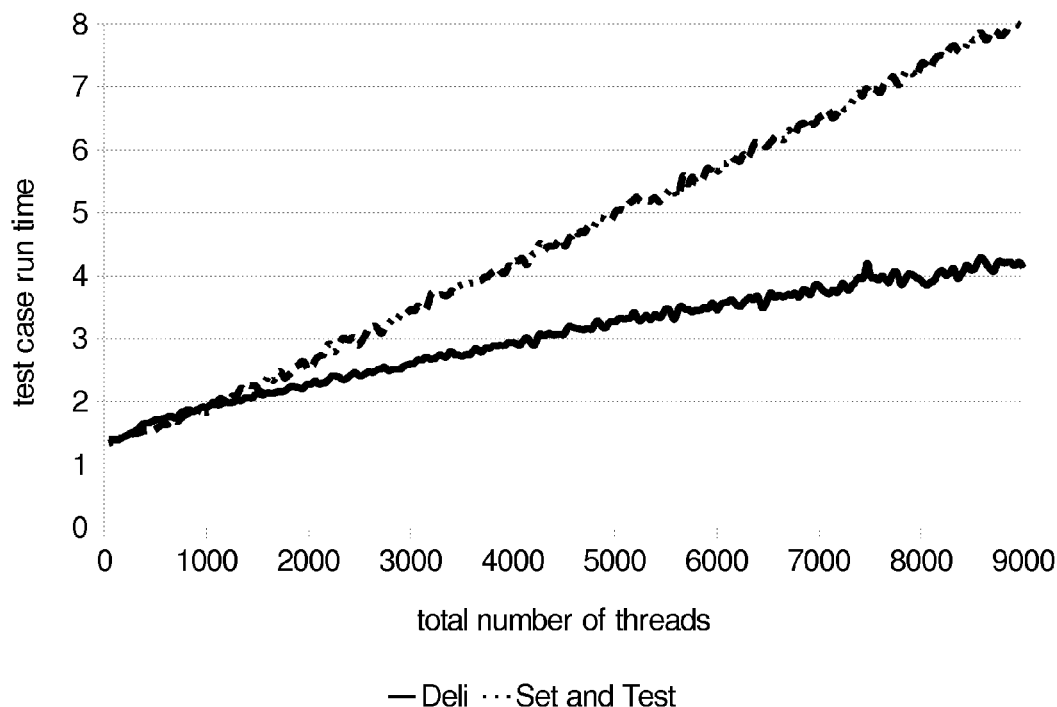
FIG. 23 shows a graph of test case run time versus total number of threads in a fifth test case scenario in which a majority of load threads cause a bottleneck on a heavily used passive lock delaying a minority of work threads completing their work.

Referring to FIG. 23, the graph shows the test case run time versus the total number of threads, both load and worker threads, for a large total number of threads accessing a heavily used passive lock, that is, a system under stress. The "Set and test" line, in "dot-dash", shows that as the number of threads accessing the heavily used passive lock increases in a conventional Test, Set and Test, Back off scenario, the test case run time increases linearly. In some embodiments, the "Deli" line, in "continuous" line, also shows a linear increase in test case time for increasing number of threads accessing the heavily used passive lock. However, the test case run time for some embodiments show an improvement in execution time, once a level of just over 1,000 total threads is reached. At 9,000 total threads, the improvement in execution time reaches 100%.

Figure 24:
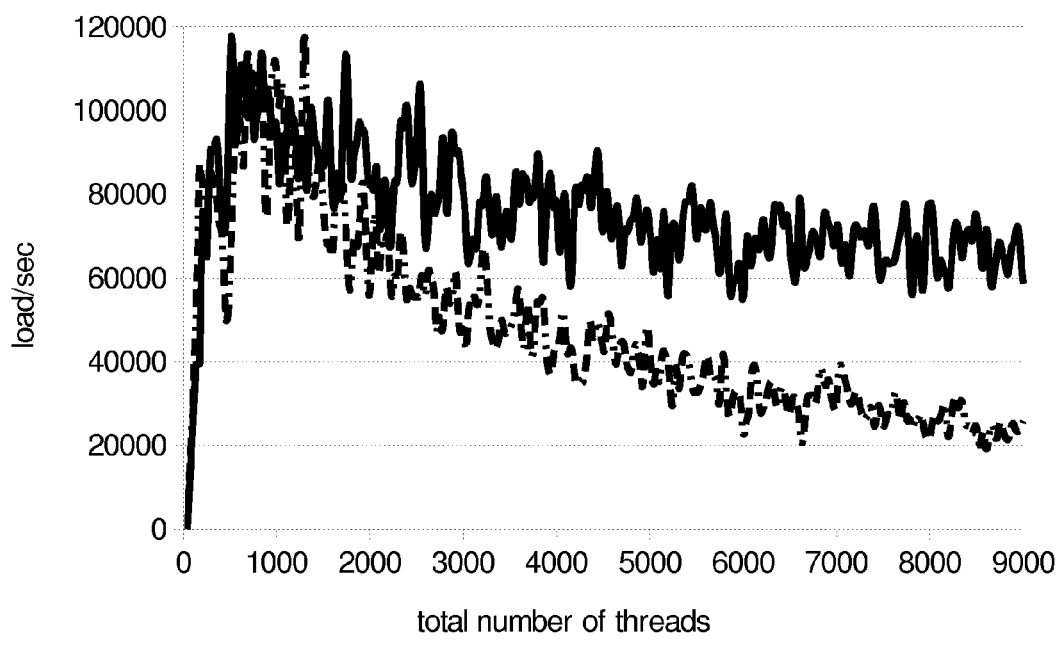
FIG. 24 shows a graph of throughput versus total number of threads in a fifth test case scenario.

Referring to FIG. 24, the graph shows the throughput through the lock, that is the number of "load" operations done per second, or the number of times the passive lock has been acquired and released per second. Throughput is measured as the number of accesses of the lock by "load" threads per second and is shown on the y-axis of the graph. The "Test and set" line, in "dot-dash", shows that as the number of threads increases in a normal Test, Set and Test, Back off scenario the throughput falls below 50% of the maximum throughput (the maximum throughput being just less than 120,000 on the y-axis scale) with the number of load threads not having doubled and steadily decreases after that. In some embodiments, the "Deli" line, in continuous line, shows a lock throughput above 50% of the maximum throughput (50% of the maximum throughput being just less than 60,000 on the y-axis scale) at all times. This fall in throughput starts once a level of just over 1,000 total threads is reached.

Figure 25:
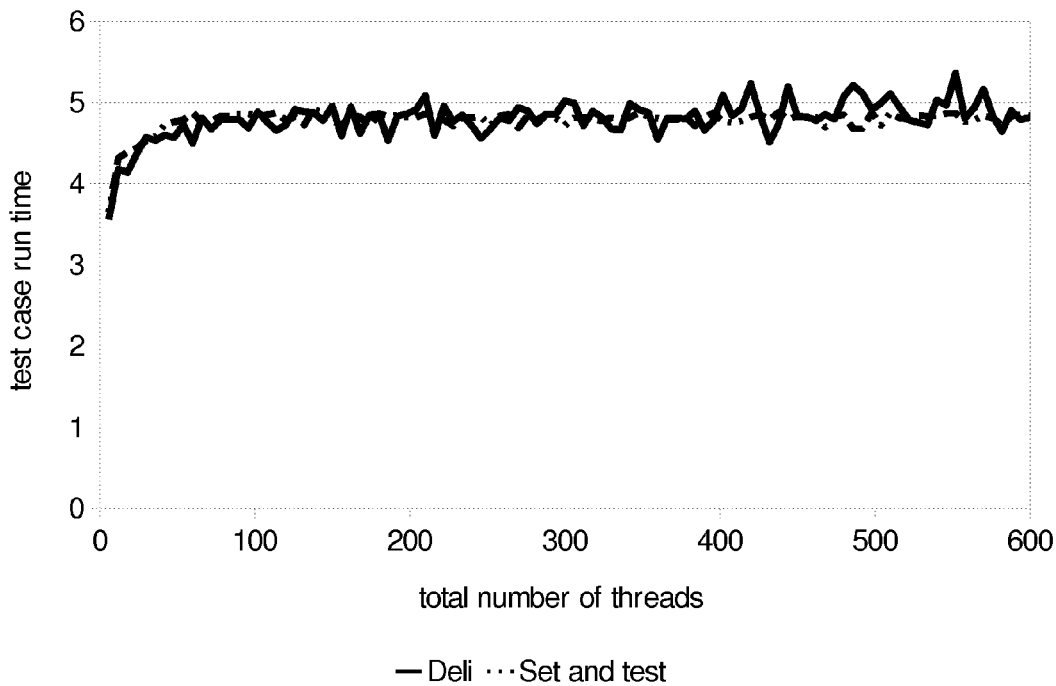
FIG. 25 shows the graph of FIG. 23 in a sixth test case scenario in which the passive lock is not heavily used.
Figure 26:
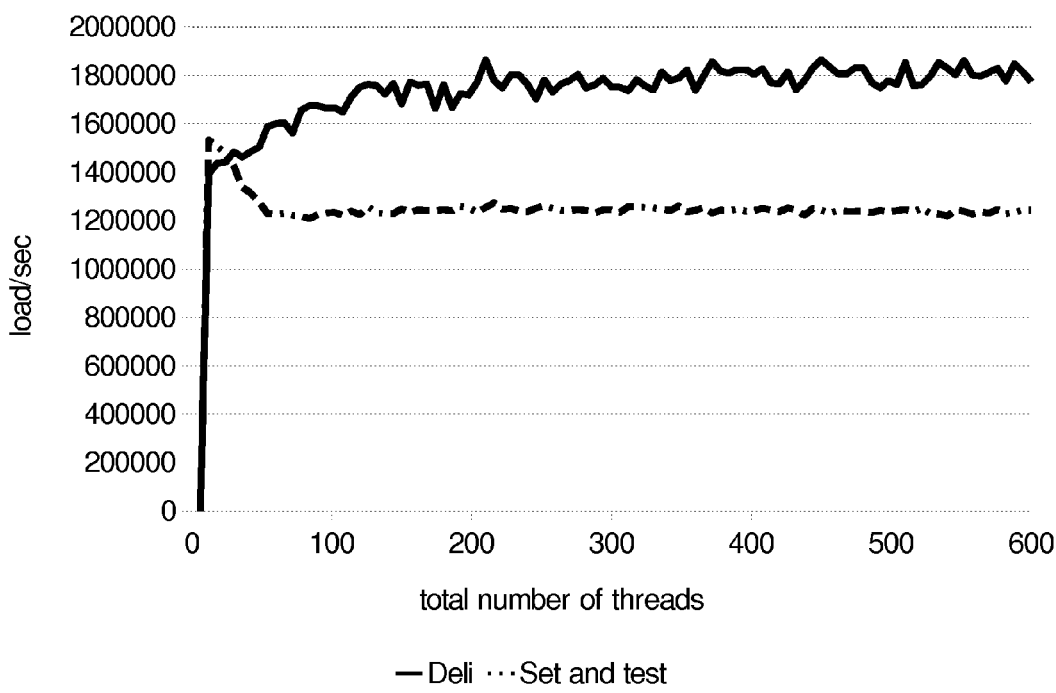
FIG. 26 shows the graph of FIG. 24 in a sixth test case scenario in which the passive lock is not heavily used.

The graphs of FIGS. 23 and 24 showed the effect on test case run time and load throughput of a bottleneck on a heavily used passive lock getting progressively worse as the total number of threads increases. In the graphs of FIGS. 23 and 24, the total number of threads shown on the x-axis ranges from 0 to 9,000, the 9,000 total threads representing heavy usage. The graphs of FIGS. 25 and 26 shows the effect on test case run time and load throughput of a bottleneck on the same passive lock when it is not heavily used. In the graphs of FIGS. 25 and 26, the total number of threads shown on the x-axis ranges from 0 to 600, the 600 threads representing light usage.

Referring to FIG. 25, the graph shows the test case run time versus the total number of threads, both load and worker threads, for a small total number of threads accessing a passive lock, that is, a system which is not under stress. The "Set and test" line, in "dot-dash", shows that as the number of threads accessing the passive lock when it is not heavily used increases in a conventional Test, Set and Test, Back off scenario, the test case run time remains substantially constant. In some embodiments, the "Deli" line, in "continuous" line, also shows that as the number of threads accessing the passive lock when it is not heavily used increases in a conventional Test, Set and Test, Back off scenario, the test case run time remains substantially constant and approximately equal in time to the Test, Set and Test, Back off scenario.

Referring to FIG. 26, the graph shows the throughput through the lock, that is the number of "load" operations done per second, or the number of times the passive lock has been acquired and released per second. Throughput is measured as the number of accesses of the lock by "load" threads per second and is shown on the y-axis of the graph. The "Set and test" line, in "dot-dash", shows that as the number of threads increases in a normal Test, Set and Test, Back off scenario the throughput falls from a peak of about 153,000 at 12 total threads to a level of about 124,000 at 54 threads and above in total. In some embodiments, the "Deli" line, in continuous line, the throughput increases steadily until about 132 total threads and then increases slightly as the total number of threads increases until the 600 threads maximum of the graph is reached.

When not under stress, meaning that the work threads have reasonable access to the CPUs and therefore the work is unaffected, the Deli algorithm demonstrates 50% more passive lock throughput than Test, Set and Test, Back off.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for managing exclusive control of a shareable resource between a plurality of concurrently executing threads, the method comprising:
   determining at intervals a number of concurrently executing threads waiting for exclusive control of the shareable resource;
   comparing the number of concurrently executing threads waiting for exclusive control of the sharable resource to a pre-determined value;
   responsive to the number of concurrently executing threads waiting for exclusive control of the shareable resource exceeding the pre-determined value and upon a determination that it is fair for one or more of said concurrently executing threads to terminate its wait, one or more of said concurrently executing threads terminating its wait for exclusive control of the shareable resource, the terminating including dropping a current ticket for the sharable resource and returning resources associated with the shareable resource for use by others of the concurrently executing threads; and
   responsive to the number of concurrently executing threads waiting for exclusive control of the shareable resource not exceeding the pre-determined value, one or more of said one or more concurrently executing threads which terminated its wait for exclusive control of the shareable resource, restarting a wait for exclusive control of the shareable resource, the restarting including acquiring a new ticket for the sharable resource,
   wherein when it is determined that a concurrently executing thread has previously terminated and restarted a wait for exclusive control of the shareable resource, it does not terminate its wait for exclusive control of the shareable resource, and wherein when an exclusive control of the shareable resource is granted in an ordered manner, concurrently executing threads do not terminate their wait for exclusive control of the shareable resource when a preceding thread has terminated its wait for exclusive control of the shareable resource.

2. The method of claim 1, wherein upon said one or more of said concurrently executing threads terminating its wait for exclusive control of the shareable resource, another of the concurrently executing threads from a system ready queue begins execution.

3. The method of claim 2, further comprising, before said terminating its wait for exclusive control of the shareable resource, said one or more concurrently executing threads checking for the presence of others of said one or more concurrently executing threads in a system ready queue and not terminating its wait for exclusive control of the shareable resource if there are no other concurrently executing threads in the system ready queue.

4. The method of claim 1, wherein access to the shareable resource is controlled by a passive lock comprising a sequence of an outer busy lock and an inner busy lock, a first one of said concurrently executing threads wanting exclusive control of the shareable resource acquiring the outer busy lock, followed by the inner busy lock, the method further comprising:
   on releasing control of the passive lock, said first one of said concurrently executing threads acquires the inner busy lock and determines the number of concurrently executing threads waiting for exclusive control of the shareable resource; and
   further responsive to a determination that the number of concurrently executing threads waiting for exclusive control of the shareable resource exceeds a pre-determined value and upon a determination that it is fair for one or more of said concurrently executing threads to terminate its wait, said first one of said concurrently executing threads passing ownership of the passive lock and the inner busy lock to a concurrently executing thread located at the front of a system ready queue.

5. A system for managing exclusive control of a shareable resource between a plurality of concurrently executing threads, the system comprising:
   a memory having computer readable computer instructions; and
   a processor for executing the computer readable computer instructions, the computer readable computer instructions comprising:
   determining at intervals a number of concurrently executing threads waiting for exclusive control of the shareable resource;
   comparing, by the processor, the number of concurrently executing threads waiting for exclusive control of the sharable resource to a pre-determined value;
   responsive to the number of concurrently executing threads waiting for exclusive control of the shareable resource exceeding the pre-determined value and upon a determination that it is fair for one or more of said concurrently executing threads to terminate its wait, one or more of said concurrently executing threads terminating its wait for exclusive control of the shareable resource, the terminating including dropping a current ticket for the sharable resource and returning resources associated with the shareable resource for use by others of the concurrently executing threads; and
   responsive to the number of concurrently executing threads waiting for exclusive control of the shareable resource not exceeding the pre-determined value, for one or more of said one or more concurrently executing threads which terminated its wait for exclusive control of the shareable resource, restarting a wait for exclusive control of the shareable resource, the restarting including acquiring a new ticket for the sharable resource, wherein when it is determined that a concurrently executing thread has previously terminated and restarted a wait for exclusive control of the shareable resource, it does not terminate its wait for exclusive control of the shareable resource, and wherein when an exclusive control of the shareable resource is granted in an ordered manner, concurrently executing threads do not terminate their wait for exclusive control of the shareable resource when a preceding thread has terminated its wait for exclusive control of the shareable resource.

6. The system of claim 5, wherein the instructions further comprise, upon said one or more of said concurrently executing threads terminating its wait for exclusive control of the shareable resource, for beginning execution of another of the concurrently executing threads from a system ready queue.

7. The system of claim 6, wherein the instructions further comprise for said one or more concurrently executing threads checking for the presence of others of said one or more concurrently executing threads in a system ready queue before terminating its wait for exclusive control of the shareable resource if there are no other concurrently executing threads in a system ready queue.

8. The system of claim 5, wherein access to the shareable resource is controlled by a passive lock comprising a sequence of an outer busy lock and an inner busy lock, a first one of said concurrently executing thread wanting exclusive control of the shareable resource acquiring the outer busy lock, followed by the inner busy lock, the system further comprising:

on releasing control of the passive lock, means for said first one of said concurrently executing thread to acquire the inner busy lock and determine the number of concurrently executing threads waiting for exclusive control of the shareable resource; and wherein, responsive to a determination that the number of concurrently executing threads waiting for exclusive control of the shareable resource exceeds a pre-determined value and upon a determination that it is fair for one or more of said concurrently executing threads to terminate its wait, for said first concurrently executing thread passing ownership of the passive lock and the inner busy lock to the concurrently executing thread located at the front of a system ready queue.

9. A computer program product for managing exclusive control of a shareable resource between a plurality of concurrently executing threads, the computer program product comprising:

a computer readable storage medium having computer readable program code embodied therewith, the computer readable program code adapted to perform the following method when said program is run on a computer:

determining at intervals a number of concurrently executing threads waiting for exclusive control of the shareable resource;

comparing, by the processor, the number of concurrently executing threads waiting for exclusive control of the sharable resource to a pre-determined value;

responsive to the number of concurrently executing threads waiting for exclusive control of the shareable resource exceeding the pre-determined value and upon a determination that it is fair for one or more of said concurrently executing threads to terminate its wait, one or more of said concurrently executing threads terminating its wait for exclusive control of the shareable resource, the terminating including dropping a current ticket for the sharable resource and returning resources associated with the sharable resource for use by others of the concurrently executing threads; and responsive to the number of concurrently executing threads waiting for exclusive control of the shareable resource not exceeding the pre-determined value, one or more of said one or more concurrently executing threads which terminated its wait for exclusive control of the shareable resource, restarting a wait for exclusive control of the shareable resource, the restarting including acquiring a new ticket for the sharable resource, wherein when it is determined that a concurrently executing thread has previously terminated and restarted a wait for exclusive control of the shareable resource, it does not terminate its wait for exclusive control of the shareable resource, and wherein when an exclusive control of the shareable resource is granted in an ordered manner, concurrently executing threads do not terminate their wait for exclusive control of the shareable resource when a preceding thread has terminated its wait for exclusive control of the shareable resource.

10. The computer program product of claim 9, wherein upon said one or more of said concurrently executing threads terminating its wait for exclusive control of the shareable resource, another of the concurrently executing threads from a system ready queue begins execution.

11. The computer program product of claim 10, further comprising, before terminating its wait for exclusive control of the shareable resource, said one or more concurrently executing threads checking for the presence of others of said one or more concurrently executing threads in a system ready queue and not terminating its wait for exclusive control of the shareable resource if there are no other concurrently executing threads in the system ready queue.

* * * * *